US009459444B2

(12) United States Patent
Hwang

(10) Patent No.: US 9,459,444 B2
(45) Date of Patent: Oct. 4, 2016

(54) ELECTROWETTING DISPLAY DEVICE WITH LIGHT ABSORBING PARTITION WALLS

(71) Applicant: Amazon Technologies, Inc., Seattle, WA (US)

(72) Inventor: Tae Hyung Hwang, Seoul (KR)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 13/692,698

(22) Filed: Dec. 3, 2012

(65) Prior Publication Data
US 2014/0029080 A1    Jan. 30, 2014

(30) Foreign Application Priority Data
Jul. 25, 2012   (KR) .................. 10-2012-0081281

(51) Int. Cl.
*G02B 26/00* (2006.01)
*G09G 3/34* (2006.01)
(52) U.S. Cl.
CPC ............ *G02B 26/005* (2013.01); *G09G 3/348* (2013.01); *G09G 2300/0452* (2013.01); *G09G 2300/0809* (2013.01); *Y10T 29/49126* (2015.01)
(58) Field of Classification Search
CPC .... G02F 1/167; G02F 1/1676; G02F 1/1678; G02B 26/005; G02B 26/0833
USPC ................. 359/237–254, 265–275, 290–298
See application file for complete search history.

(56) References Cited

U.S. PATENT DOCUMENTS

| 7,420,549 | B2 | 9/2008 | Jacobson et al. | |
|---|---|---|---|---|
| 7,548,363 | B2 | 6/2009 | Hayes et al. | |
| 7,755,582 | B2* | 7/2010 | Hagood et al. | 345/84 |
| 7,821,699 | B1* | 10/2010 | Lo et al. | 359/290 |
| 7,940,445 | B2* | 5/2011 | Feil et al. | 359/228 |
| 7,993,819 | B2 | 8/2011 | Lo et al. | |
| 8,023,167 | B2* | 9/2011 | Sampsell | 359/238 |
| 2007/0075941 | A1 | 4/2007 | Zhou et al. | |
| 2010/0302615 | A1 | 12/2010 | Aubert et al. | |
| 2011/0084944 | A1 | 4/2011 | Bae | |
| 2011/0285714 | A1* | 11/2011 | Swic et al. | 345/428 |

FOREIGN PATENT DOCUMENTS

| KR | 10-2007-0097810 | 10/2007 |
|---|---|---|
| KR | 10-2008-0002201 | 1/2008 |

(Continued)

OTHER PUBLICATIONS

English Abstract for Publication No. 10-2007-0097810.

(Continued)

*Primary Examiner* — Bumsuk Won
*Assistant Examiner* — Tamara Y Washington
(74) *Attorney, Agent, or Firm* — Lee & Hayes, PLLC

(57) ABSTRACT

An electrowetting display device includes a first base substrate, a second base substrate facing the first base substrate, an electrowetting layer that includes a first fluid and an electrically conducting second fluid that are immiscible with each other, black partition walls disposed on the first base substrate to partition a display area into pixel areas, and an electronic device that applies a voltage to the electrowetting layer to control the electrowetting layer. The partition walls restrict a flow of at least one of the first fluid or the second fluid.

28 Claims, 24 Drawing Sheets

(56) References Cited

FOREIGN PATENT DOCUMENTS

| KR | 10-2011-0112946 | 10/2011 |
|---|---|---|
| WO | WO 2009/071694 | 6/2009 |
| WO | WO 2010/012831 | 2/2010 |

OTHER PUBLICATIONS

English Abstract for Publication No. 10-2008-0002201.
English Abstract for Publication No. 10-2011-0112946.

* cited by examiner

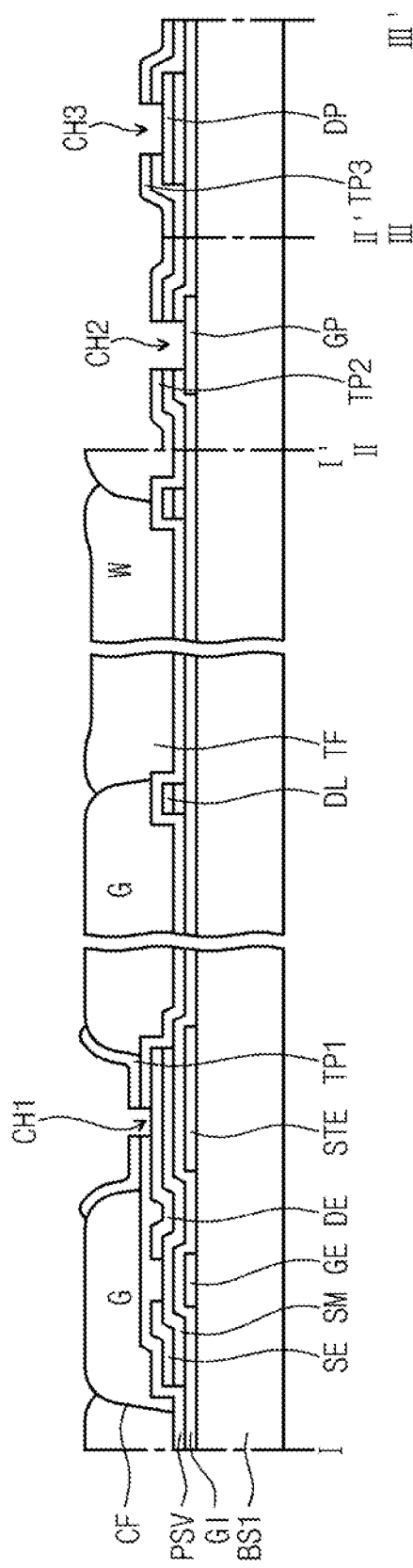

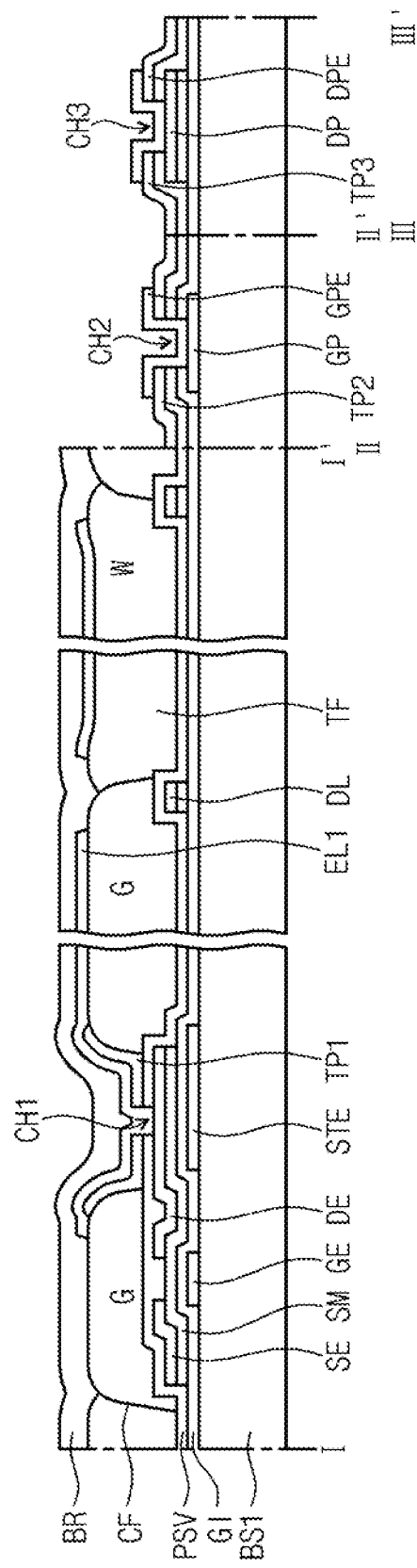

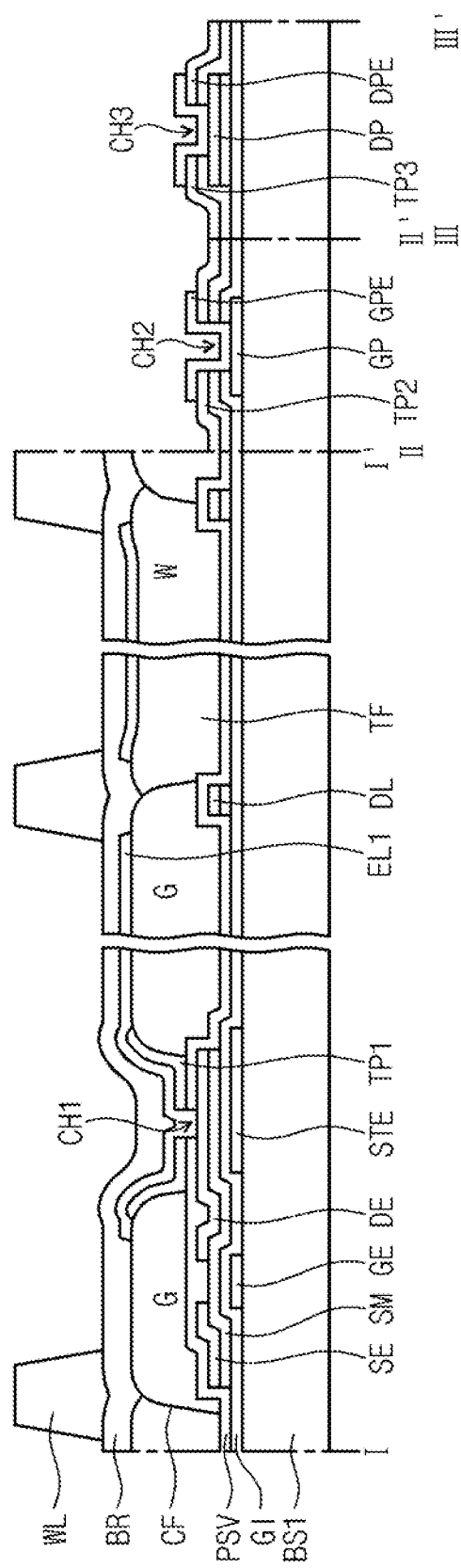

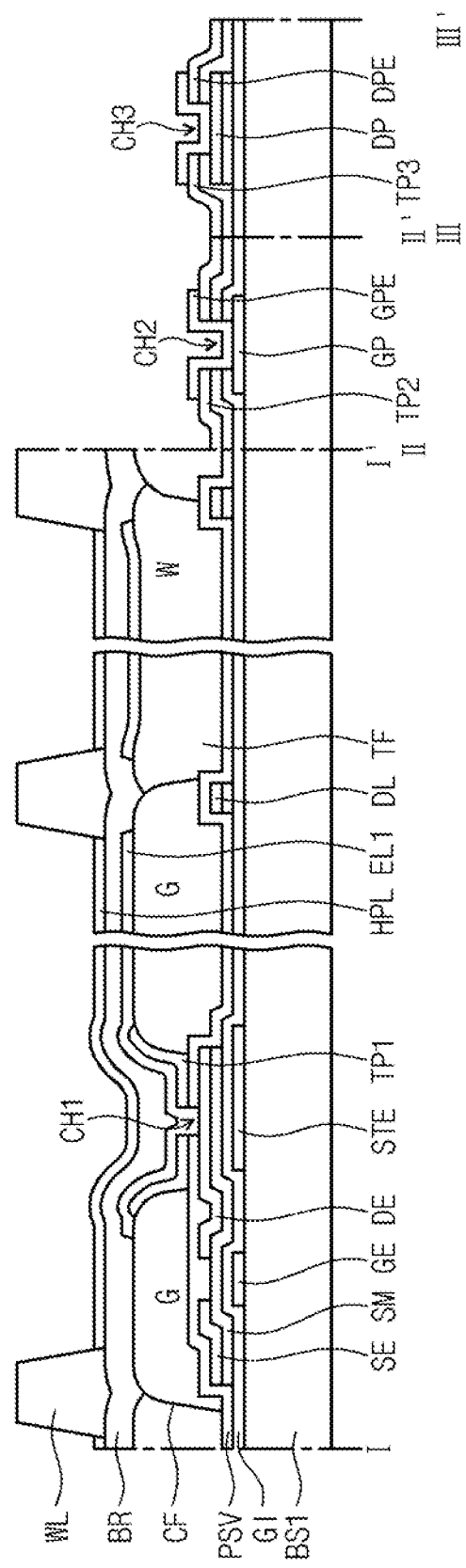

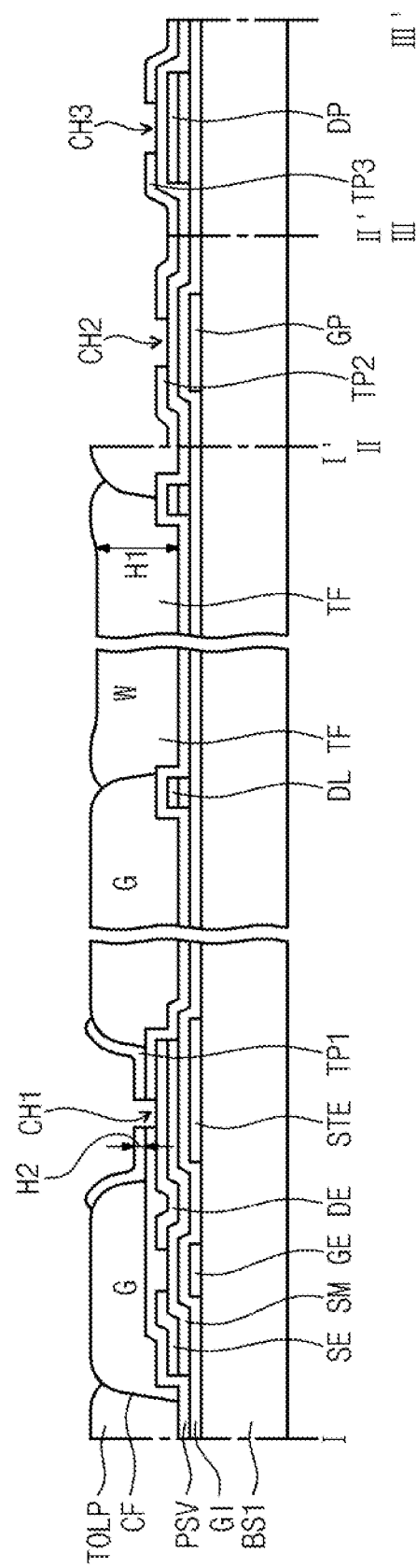

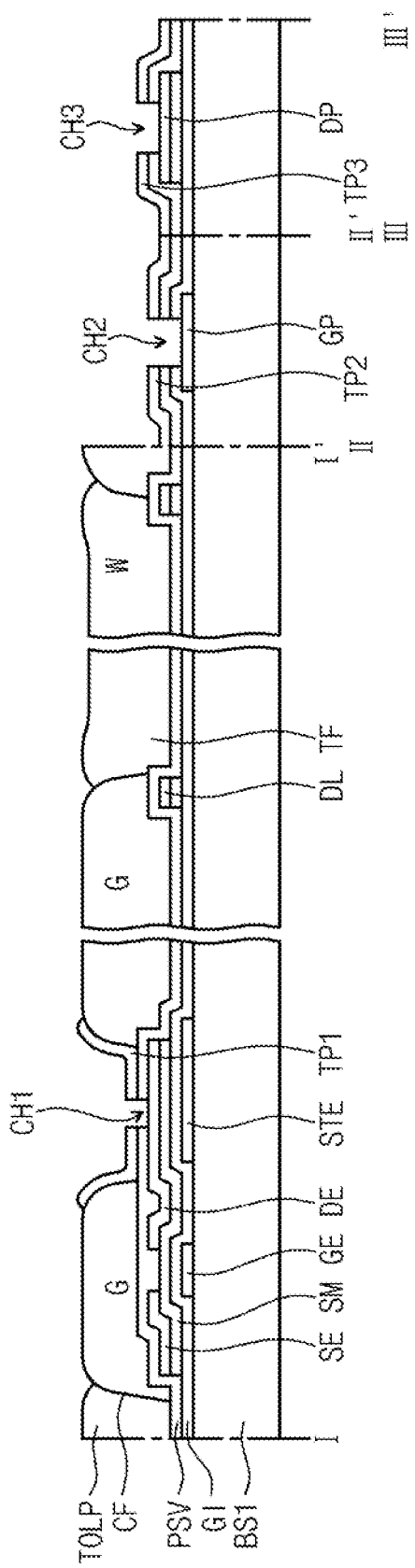

ELECTROWETTING DISPLAY DEVICE WITH LIGHT ABSORBING PARTITION WALLS

CROSS-REFERENCE TO RELATED APPLICATION

This U.S. non-provisional patent application claims priority under 35 U.S.C. §119 from Korean Patent Application No. 10-2012-0081281, filed on Jul. 25, 2012 in the Korean Intellectual Property Office, the contents of which are herein incorporated by reference in their entirety.

BACKGROUND

1. Technical Field

Embodiments of the present disclosure are directed to an electrowetting display device using electrowetting effect and a method of manufacturing the electrowetting display device.

2. Discussion of the Related Art

Various display devices can be used as a flat panel display device, such as a liquid crystal display, a plasma display panel, an organic light emitting display, a field effect display, an electrophoretic display, an electrowetting display, etc.

One of these devices, the electrowetting display device, applies a voltage to an aqueous liquid electrolyte to vary a surface tension of the fluid. Accordingly, an electrowetting display device reflects or transmits light incident thereto, thereby displaying desired images.

SUMMARY

Embodiments of the present disclosure provide an electrowetting display device capable of improving image display quality.

Embodiments of the present disclosure provide a method of manufacturing an electrowetting display device, which is capable of simplifying the manufacturing process, reducing the manufacturing cost, and improving image display quality.

Embodiments of the inventive concept provide an electrowetting display device that includes a first base substrate, a second base substrate facing the first base substrate, an electrowetting layer that includes a first fluid and an electrically conductive second fluid that are immiscible with each other, black partition walls disposed on the first base substrate to partition a display area into pixel areas, and an electronic device that applies a voltage to the electrowetting layer to control the electrowetting layer. The partition walls restrict a flow of at least one of the first fluid or the second fluid.

A hydrophobic layer is provided in the pixel area and is spaced apart from the partition wall when viewed in a plan view.

The electrowetting display device further includes column spacers disposed on the second base substrate to correspond to the partition walls. The column spacers and partition walls maintain a distance between the first base substrate and the second base substrate. The column spacers have a height greater than a height of the partition walls.

The electrowetting display device further includes color filters provided in some of the pixel areas to endow light passing through the color filters with a color. A transparent filter is provided in the pixel areas lacking a color filter. The transparent filter has a height corresponding to a height of the color filter.

Embodiments of the inventive concept provide a method of manufacturing an electrowetting display device that includes forming first electrodes on a display area of a first base substrate, vapor depositing a barrier layer in the display area using a shadow mask; forming black partition walls to partition the display area into pixel areas, forming a hydrophobic layer in the pixel areas, and forming an electrowetting layer in the pixel areas.

The hydrophobic layer is formed with one of a spray method, a patch slit method, or an inkjet method.

According to an embodiment, prior to forming the first electrode, a color filter is formed in some of the pixel areas of the first base substrate and a transparent organic layer is formed in the remaining pixel areas of the pixel areas.

According to an embodiment, the method includes forming a second electrode on a second base substrate, forming column spacers on the second base substrate to correspond to the partition walls of the first base substrate, and coupling the second base substrate to the first base substrate to face the first base substrate.

Embodiments of the inventive concept provide an electrowetting display device that includes a plurality of first electrodes, a second electrode facing the plurality of first electrodes, black partition walls disposed between the first electrodes, a hydrophobic layer disposed over the first electrodes between the partition walls, and an electrowetting layer disposed between the first and second electrodes and the partition walls. The electrowetting layer includes a first fluid and an electrically conductive second fluid that are immiscible with each other. The partition walls restrict a flow of at least one of the first fluid or the second fluid, and a potential difference between the first and second electrodes causes the electrically conductive second fluid to push aside the first fluid to make contact with the hydrophobic layer.

The electrowetting display device further includes a first base substrate upon which the first electrodes are disposed, a second base substrate upon which the second electrode is disposed, and column spaces disposed on the second base substrate to correspond to the partition walls. The column spacers and partition walls maintain a distance between the first base substrate and the second base substrate. The partition walls define pixel areas in which an image is displayed.

The electrowetting display device may further include a switching device disposed on the first base substrate and connected to the first electrode, a plurality of color filters, wherein at least some pixel areas are provided with a color filter to endow light passing through the color filters with a color, and a transparent filter provided in the pixel areas lacking a color filter. A transparent contact hole pattern is disposed between the color filters on the switching device to cover at least a portion of the switching device. A contact hole of the contact hole pattern exposes a portion of the switching device, and the first electrode is connected to the switching device through the contact hole.

According to the above, an image display quality of an electrowetting display device may be improved. In addition, a manufacturing process of an electrowetting display device may be simplified, and the manufacturing time and cost of an electrowetting display device may be reduced.

BRIEF DESCRIPTION OF THE DRAWINGS

FIGS. 9A to 9I are cross-sectional views illustrating a method of FIG. 8 of manufacturing the electrowetting display device shown in FIGS. 6A and 6B, which are taken along lines I-I', II-II', and III-III' shown in FIG. 6A.

FIGS. 10A to 10C are cross-sectional views showing a sixth mask process.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, exemplary embodiments of the present disclosure will be explained in detail with reference to the accompanying drawings.

Figure 1:
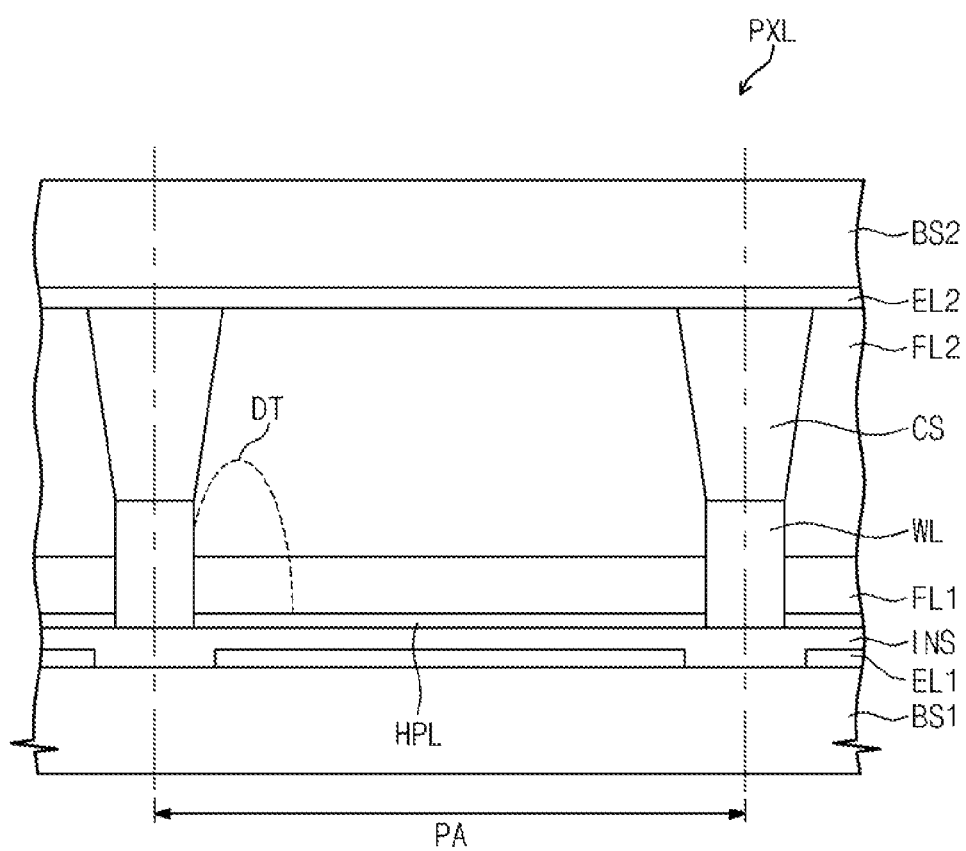
FIG. 1 is a cross-sectional view showing a part of an electrowetting display device according to an exemplary embodiment of the present disclosure.

FIG. 1 is a cross-sectional view showing a part of an electrowetting display device according to an exemplary embodiment of the present disclosure. An electrowetting display device includes a plurality of pixels PXL of which one is shown in FIG. 1. In FIG. 1, a side length of the pixel PXL has been indicated by two dotted lines.

Referring to FIG. 1, each pixel PXL includes an array substrate, an opposite substrate, and electrowetting layers FL1 and FL2. The array substrate includes a first base substrate BS1, a first electrode EL1, a switching device (not shown), a partition wall WL, and a hydrophobic layer HPL. The opposite substrate includes a second base substrate BS2, a second electrode EL2, and a column spacer CS. The first electrode EL1, the switching device, and the second electrode EL2 serve as an electronic device to drive the electrowetting layers FL1 and FL2.

The electrowetting display device includes a front surface on which an image is displayed and a rear surface opposite to the front surface. A viewer may perceive an image displayed on the front surface of the electrowetting display device. In a present exemplary embodiment, an outer surface of the second base substrate BS2, i.e., an upper surface of the second base substrate BS2 in FIG. 1, may be referred to as the front surface or the upper surface, and an opposite surface to the front or upper surface may be referred to as the rear surface or a lower surface. However, the positions of the front surface and the rear surface are not limited thereto. That is, the positions of the front and rear surfaces may change depending on an operating mode of the electrowetting display device, which includes a reflective mode, a transmissive mode, a transflective mode, etc. An electrowetting display device may be a segmented display type in which the image is built up of segments. The electrowetting display device may be an active matrix driving display device or a passive matrix driving display device.

Each of the first base substrate BS1 and the second base substrate BS2 may be formed in a single body to be commonly shared by the pixels PXL or may be formed separately to be used as a portion of each pixel PXL. The first base substrate BS1 or the second base substrate BS2 may each be, but are not limited to, a transparent insulator such as a glass or a polymer such as plastic. When the first base substrate BS1 or the second base substrate BS2 is a plastic substrate, the first base substrate BS1 or the second base substrate BS2 may each be formed of polyethylene terephthalate (PET), fiber reinforced plastic (FRP), or polyethylene naphthalate (PEN). In addition, the first base substrate BS1 or the second base substrate BS2 may each be rigid or flexible.

The electrowetting layers FL1 and FL2 are provided in a space defined by the partition wall WL and the first base substrate BS1 or the second base substrate BS2 respectively. The electrowetting layers FL1 and FL2 include a first fluid FL1 and a second fluid FL2. The first and second fluids FL1 and FL2 are immiscible with each other. The second fluid FL2 may be electrically conductive, and may include either a potassium chloride solution or a sodium chloride solution in water and ethyl alcohol. The second fluid FL2 may be transparent or have a color. For example, the second fluid FL2 may be white, or absorb or reflect light from the outside.

The first fluid FL1 may be non-conductive, such as an alkane such as hexadecane, oil like silicone oil, etc. Hereinafter, for the convenience of explanation, unless explained otherwise, the first fluid FL1 may be a non-conducting oil and the second fluid FL2 may be an electrically conductive electrolyte solution.

The first fluid FL1 may absorb at least a portion of the optical spectrum of visible light. The first fluid FL1 may transmit a portion of the optical spectrum, so that the first fluid FL1 displays a color. The first fluid FL1 may include pigment particles or dyes to display the color. According to embodiments, the first fluid FL1 may be tinged with black. In this case, the first fluid FL1 absorbs substantially the entire optical spectrum. In addition, the second fluid FL2 may reflect the optical spectrum.

The partition wall WL define pixel areas PA corresponding to the pixels PXL in a one-to-one correspondence. The partition wall WL absorbs light in a visible wavelength range and is black. Accordingly, the partition wall WL prevents crosstalk between adjacent pixels and light passing through adjacent pixels from leaking. In a present exemplary embodiment, the partition wall WL absorbs light in the visible wavelength range, but transmits light in an infrared wavelength range. In this case, since the partition wall WL transmits infrared light, defects in the area in which the partition wall WL is formed may be identified when inspecting the electrowetting display device.

The pixel area PA defined by the partition wall WL has been represented by dotted lines. In a present exemplary embodiment, the partition wall WL is formed on and protruded from the first base substrate BS1, and the first base substrate BS1 and the partition wall WL define each pixel area PA. The partition wall WL restricts the flow of at least one of the first fluid FL1 or the second fluid FL2. To this end, at least a portion of the surface of the partition wall WL is hydrophilic, e.g., incompatible with the first fluid FL1. For example, in the surface of the partition wall WL, an upper surface substantially parallel to the first base substrate BS1 and side surfaces connecting the upper surface to the first base substrate BS1 may be hydrophilic, or, alternatively, the side surfaces may be hydrophobic and the upper surface may be hydrophilic. Thus, the partition wall WL is not easily wetted by the first fluid FL1, and the first fluid FL1 may not flow to an adjacent pixel area PA thereto even though the partition wall WL may have a height lower than that of the first fluid FL1. As a result, the first fluid FL1 is limited by the partition wall WL in each pixel area PA to flow in the space of the pixel area PA, so that the first fluid FL1 does not flow into an adjacent pixel area PA.

As described above, the partition wall WL may have a height sufficient to prevent the first fluid FL1 from flowing into the adjacent pixel area PA when the electronic device is driven, and thus the partition wall WL may have a height between a maximum height of the first fluid FL1 and a half of the maximum height of the first fluid FL1.

The column spacer CS is provided on and protruded from the second base substrate BS2. The column spacer CS is located at a position corresponding to the partition wall WL and an upper surface of the column spacer CS makes direct contact with the partition wall WL. The column spacer CS, in cooperation with the partition wall WL, maintains a distance referred to as a cell gap between the first base substrate BS1 and the second base substrate BS2. The column spacer CS has a height greater than that of the partition wall WL, e.g., from about two times to about four times greater than the height of the partition wall WL.

In a conventional electrowetting display device, the column spacer is provided separately from the partition wall WL and disposed on the second base substrate BS2 to make direct contact with the upper surface of the first base substrate BS1. On the other hand, since the column spacer CS in a present exemplary embodiment makes direct contact with the partition wall WL and maintains the cell gap together with the partition wall WL, the height of a column spacer CS may be reduced when compared to a column spacer in a conventional electrowetting display device. The cell gap is set to allow the first fluid FL1 and the second fluid FL2 provided in each pixel area PA to flow smoothly within the pixel area PA. In particular, the cell gap is set to be greater than the maximum height of the first fluid FL1, which is determined when the first fluid FL1 does not make contact with the second base substrate BS2 while flowing within the pixel area PA.

The hydrophobic layer HPL is disposed on the first base substrate BS1 to correspond to the pixel area PA defined by the partition wall WL. The hydrophobic layer HPL is provided to cover the pixel area PA of the pixel PXL except for the area in which the partition wall WL is formed, and the hydrophobic layer HPL of the pixel PXL is separated from the hydrophobic layer HPL of an adjacent pixel PXL by the partition wall WL. That is, when viewed in a plan view, there is no hydrophobic layer HPL between the partition wall WL and the first base substrate BS1. Accordingly, the hydrophobic layer HPL does not overlap the partition wall WL when viewed in a plan view. In addition, an insulating layer INS is disposed between the first base substrate BS1 and the hydrophobic layer HPL, and between the first base substrate BS1 and the partition wall WL. The insulating layer INS may have either a single-layer structure or a multi-layer structure, e.g., a double-layer structure.

The hydrophobic layer HPL may be permeable or reflective. When the hydrophobic layer HPL is reflective, outside light may be totally reflected by the hydrophobic layer HPL. In addition, the hydrophobic layer HPL may be white or may absorb a portion of the light corresponding to a specific wavelength and reflect the other portions of the light to display a specific color.

The hydrophobic layer HPL may include a hydrophobic material, e.g., a fluorine compound.

The electronic device provided in each pixel applies an electric potential difference between the electrowetting layers FL1 and FL2 to control the electrowetting layers FL1 and FL2. The first electrode EL1 of the electronic device is disposed on the first base substrate BS1. The switching device is provided on the first base substrate BS1 and connected to the first electrode EL1. The second electrode EL2 is disposed on the second base substrate BS2.

The first electrode EL1 is disposed between the first base substrate BS1 and the hydrophobic layer HPL. The first electrode EL1 is provided between the first base substrate BS1 and the insulating layer INS. In this case, the insulating layer INS serves as a barrier layer to prevent the first electrode EL1 from being shorted by the second fluid FL2.

The first electrode EL1 is separated from the electrowetting layers FL1 and FL2 by the hydrophobic layer HPL. The first electrode EL1 may be provided in any desired shape. The switching device applies a voltage to the first electrode EL1. The switching device is provided in each pixel.

The second electrode EL2 may be formed as an integral single body to cover all the pixels PXL. Although not shown in figures, if there are a plurality of second electrodes EL2, which respectively correspond to each pixel PXL, the second electrodes EL2 may be electrically connected to each other by the second fluid FL2.

In a present exemplary embodiment, the first electrode EL1 and the second electrode EL2 are respectively disposed on the first base substrate BS1 and the second base substrate BS2, but are not limited thereto. For example, the first and second electrodes EL1 and EL2 may be disposed on the first base substrate BS1. In this case, the second electrode EL2 may be provided on at least one side portion of the first electrode ED and be electrically insulated from the first electrode EL1. For example, the first electrode EL1 may be provided in one portion of the pixel area PA surrounded by the partition wall WL and the second electrode EL2 may be provided in another portion of the pixel area PA spaced apart from the first electrode EL1. Alternatively, the first electrode EL1 may cover the pixel area PA surrounded by the partition wall WL and the second electrode EL2 may be provided on a side surface of the partition wall WL spaced apart from the first electrode EL1.

The pixel PXL is in an ON-state when different voltages are respectively applied to the first electrode EL1 and the second electrode EL2. An electrostatic force caused by the voltages, e.g., attraction and repulsion forces, causes the second fluid FL2 to flow to the first electrode EL1, thus pushing the first fluid FL1 out from at least a portion of the hydrophobic layer HPL to the partition wall WL surrounding the hydrophobic layer HPL. When the first fluid FL1 is completely pushed out, the first fluid FL1 may have a drop shape as shown by the dotted line DT. The first fluid FL1 has a maximum height when the pixel PXL is in the ON-state. Accordingly, the hydrophobic layer HPL of the pixel PXL is exposed through the first fluid FL1.

When a voltage difference between the first and second electrodes EL1 and EL2 returns to about zero volts, the pixel PXL returns to an OFF-state, so that the first fluid FL1 again covers the hydrophobic layer HPL since the electrostatic force caused by the electric potential difference has disappeared. As described, the first fluid FL1 can serve as an optical switch that can be electrically controlled in each pixel PXL.

Figure 2:
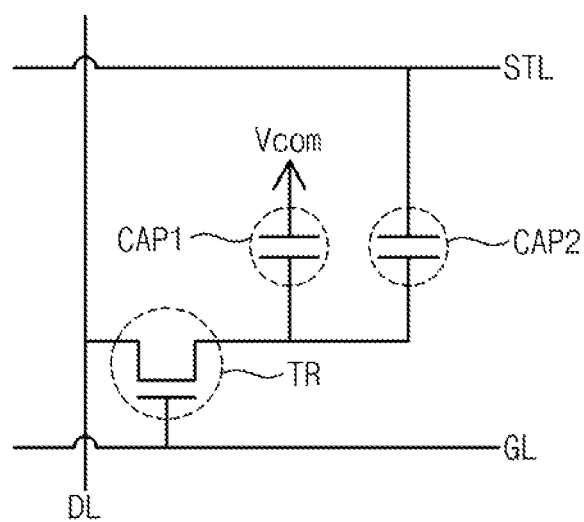
FIG. 2 is a circuit diagram showing an active matrix type pixel including a switching device.

FIG. 2 is a circuit diagram showing an active matrix type pixel including a switching device.

The switching device includes a transistor TR, and first and second capacitors CAP1 and CAP2. In a present exemplary embodiment, each pixel may include one or more transistors, although FIG. 2 shows only one transistor for each pixel. The transistor TR is connected to a wiring part.

The transistor TR includes a gate electrode, a source electrode, and a drain electrode. The wiring part includes a gate line GL and a data line DL. The gate electrode is connected to the gate line GL, the source electrode is connected to the data line DL, and the drain electrode is connected to the first and second capacitors CAP1 and CAP2. The first capacitor CAP1 is an electrowetting capacitor that includes the first electrode EL1, the second electrode EL2, and a fluid provided between the first and second electrodes EL1 and EL2. The second electrode is connected to a common voltage Vcom applied to the second fluid FL2 making contact with the second electrode EL2. The second capacitor CAP2 is a storage capacitor that includes the drain electrode (or the first electrode EL1), a storage electrode, and an insulating layer disposed between the two electrodes. The storage electrode is connected to a storage line STL.

The voltage applied to the first electrode EL1 is set by the data line DL while the switching device is operated. When a gate signal is applied to the gate line GL, the transistor TR is turned on, and thus the voltage applied to the data line DL is applied to the first and second capacitors CAP1 and CAP2. After the data voltage is applied to the first electrode EL1, the data voltage remains in the capacitors due to a coupling capacitance of the first and second capacitors CAP1 and CAP2 to drive the pixel until the voltage is refreshed.

Figure 3:
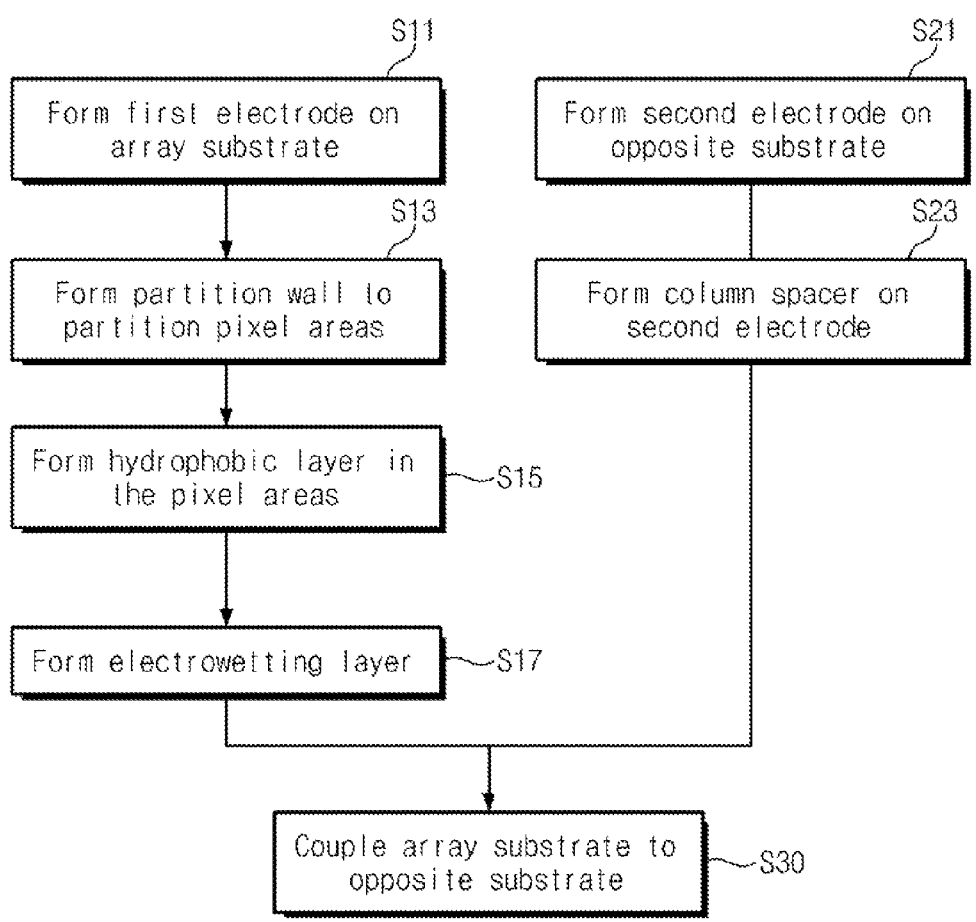
FIG. 3 is a flowchart of a method of manufacturing the electrowetting display device shown in FIG. 1.

FIG. 3 is a flowchart of a method of manufacturing an electrowetting display device shown in FIG. 1 and FIGS. 4A to 4E are cross-sectional views showing a method of manufacturing the electrowetting display device shown in FIG. 1.

Referring to FIG. 3, an electrowetting display device is manufactured by forming the first electrode EL1 on the first base substrate BS1 (step S11), forming a black partition wall WL to define the pixel area (step S13), forming the hydrophobic layer HPL in the pixel area (step S15), forming the electrowetting layers FL1 and FL2 (step S17), forming the second electrode EL2 on the second base substrate BS2 (step S21), forming the column spacer CS on the second electrode (step S23), and coupling the first base substrate BS1 to the second base substrate BS2 (step S30). Steps S21 and S23 can be performed simultaneously with steps S11, S13, S15, and S17.

Hereinafter, a method of manufacturing an electrowetting display device will be described in detail with reference to FIGS. 1 and 4A to 4E.

Figure 4A:
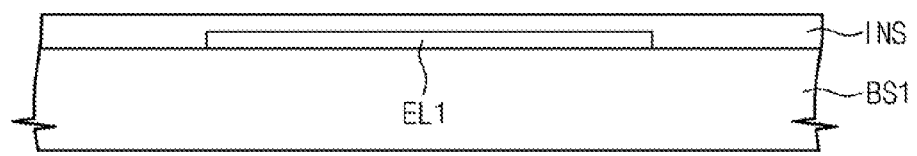
FIGS. 4A to 4E are cross-sectional views showing a method of manufacturing the electrowetting display device shown in FIG. 1.

Referring to FIG. 4A, the first base substrate BS1 is prepared and the switching device and the first electrode EL1 are formed on the first base substrate BS1. In FIG. 4, the switching device is not shown.

The insulating layer INS is formed on the first base substrate BS1 on which the first electrode EL1 is formed. The insulating layer INS may have either a single-layer structure or a multi-layer structure.

Figure 4B:
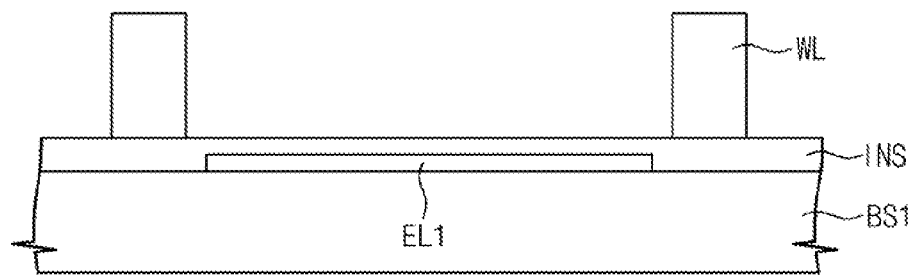

Referring to FIG. 4B, the partition wall WL is formed on the first base substrate BS1 on which the insulating layer INS is formed. The partition wall WL is formed of a black material. If the partition wall WL is formed of a black photosensitive organic material, the partition wall WL may be formed by a photolithography process including exposure and development. In this case, the photosensitive organic material is patterned by the photolithography process and cured by a baking process, thereby forming the partition wall WL.

Figure 4C:
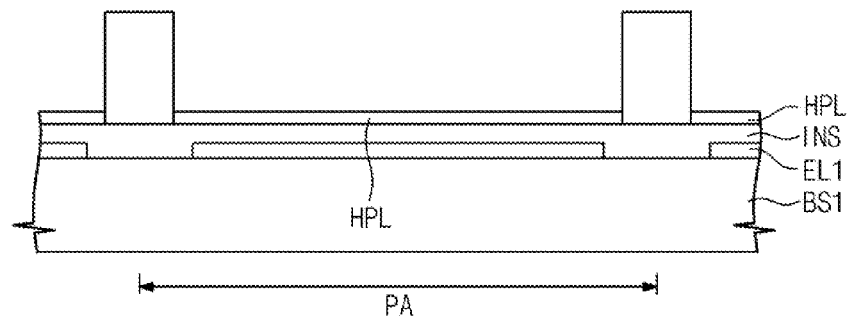

Referring to FIG. 4C, the hydrophobic layer HPL is formed on the first base substrate BS1 between the partition walls WL. The hydrophobic layer HPL is formed in the pixel area PA surrounded by the partition wall WL. The hydrophobic layer HPL is formed by using a fluorine compound such that the surface of the hydrophobic layer HPL is hydrophobic. The hydrophobic layer HPL may be formed in the pixel area by a method such as a spray method, a patch slit method, or an inkjet method, after which the hydrophobic material is cured. A separate mask is not required to form the hydrophobic material in the pixel area PA using the aforementioned methods, but embodiments are not limited to those methods.

Figure 4D:
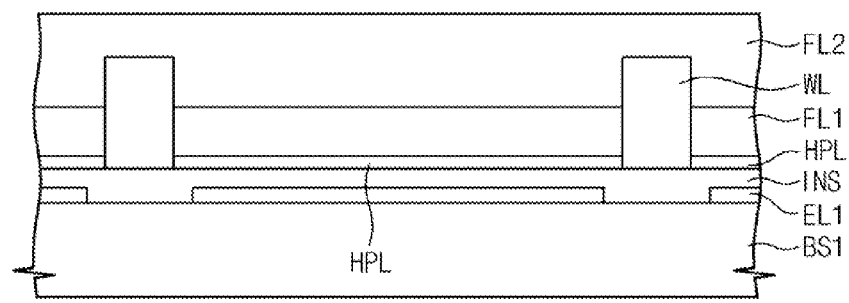

Referring to FIG. 4D, the electrowetting layers FL1 and FL2 are formed on the first base substrate BS1. The electrowetting layers FL1 and FL2 may be formed by coating the first fluid FL1 and the second fluid FL2 on the first base substrate BS1. The first and second fluids FL1 and FL2 may be coated by dipping the first base substrate BS1 into the first fluid FL1 or the second fluid FL2.

Meanwhile, the second electrode EL2 is formed on the second base substrate BS2 and the column spacer CS is formed on the second base substrate BS2 on which the second electrode EL2 is formed. The forming of the second electrode EL2 and the column spacer CS on the second base substrate BS2 is not separately shown.

The column spacer CS may be formed through a photolithography process using a mask. In a present exemplary embodiment, the column spacer CS is formed by coating a high-viscosity organic material on the second base substrate BS2 using a split coater and patterning the high-viscosity organic material using a photolithography process.

Figure 4E:
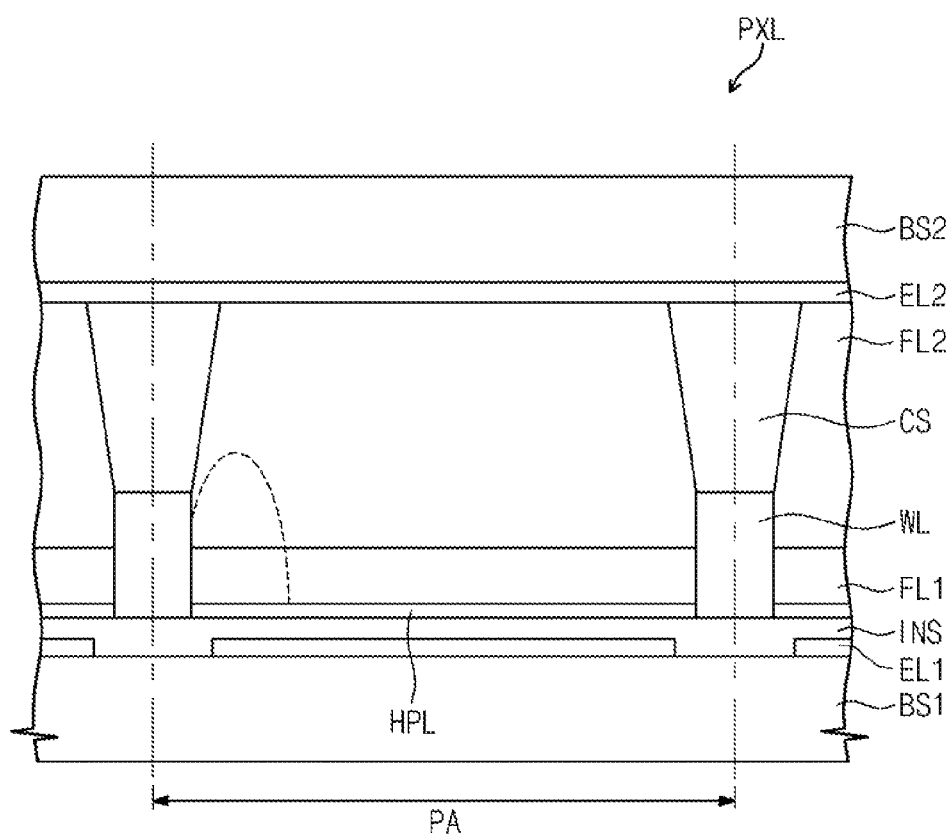

Referring to FIG. 4E, the first base substrate BS1 on which the electrowetting layers FL1 and FL2 are formed is coupled to the second base substrate BS2 on which the column spacer CS is formed, to thereby complete the electrowetting display device.

In an electrowetting display device according to a present exemplary embodiment, the partition wall functions as a black matrix and the partition wall. In a conventional electrowetting display device, the black matrix and the partition wall are separately formed, making for a more complex manufacturing process, a lengthier process time and a more costly electrowetting display device. However, according to a present exemplary embodiment, since the black partition wall is formed using a single mask without performing plural mask processes, the manufacturing process is simplified and the manufacturing cost is reduced.

In addition, according to a present exemplary embodiment, since the hydrophobic layer is formed after the partition wall is formed, a plasma treatment process and a reflow process may be omitted. Accordingly, less hydrophobic material is wasted because the plasma treatment process and the reflow process are omitted, and a thickness of the hydrophobic layer may be reduced to about 200 nm or less when compared to the hydrophobic layer of a conventional electrowetting display device. Further, defects caused by the plasma treatment process and the reflow process may be prevented.

Figure 5:
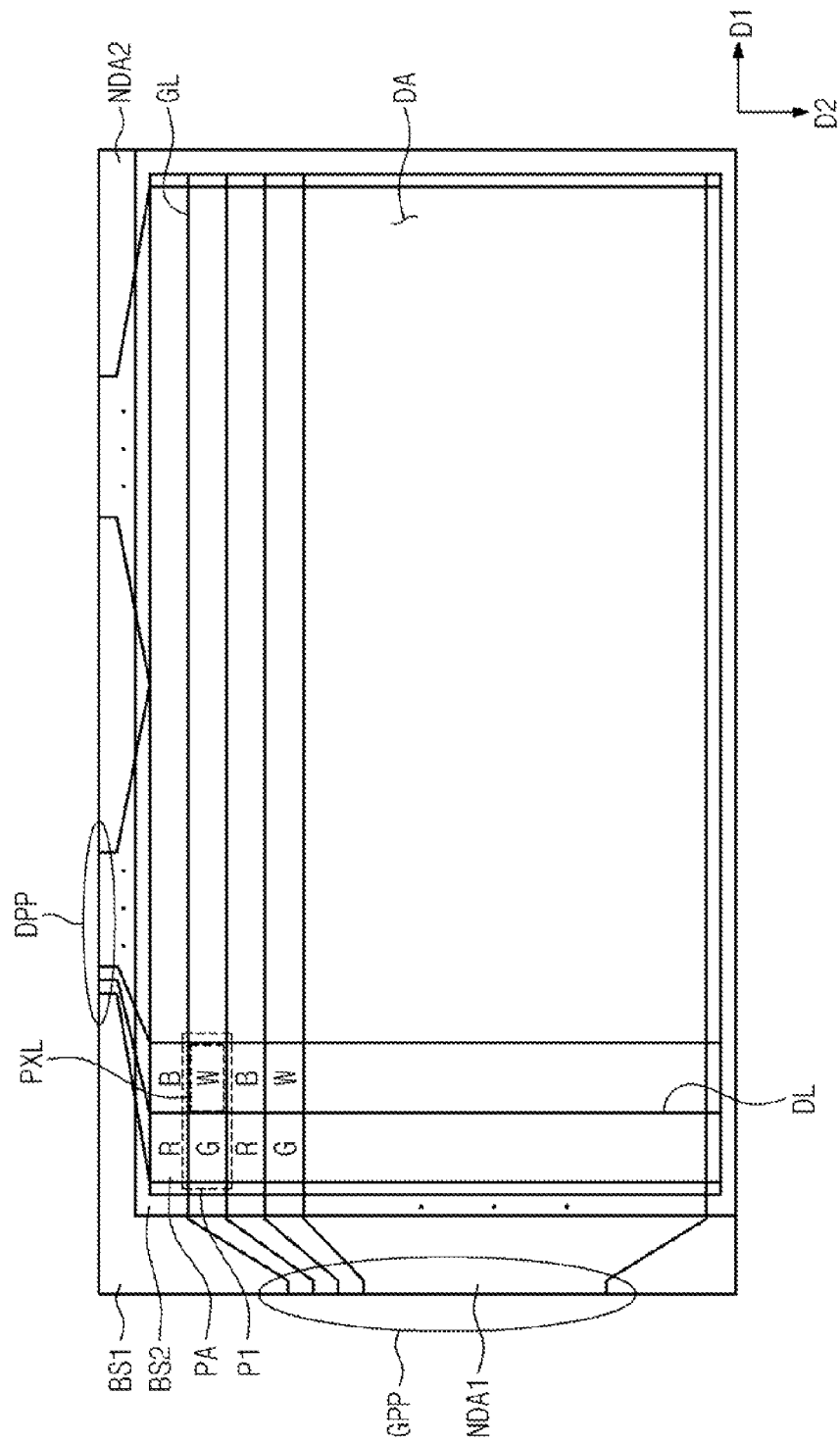
FIG. 5 is a plan view showing the electrowetting display device shown in FIG. 1.
Figure 6A:
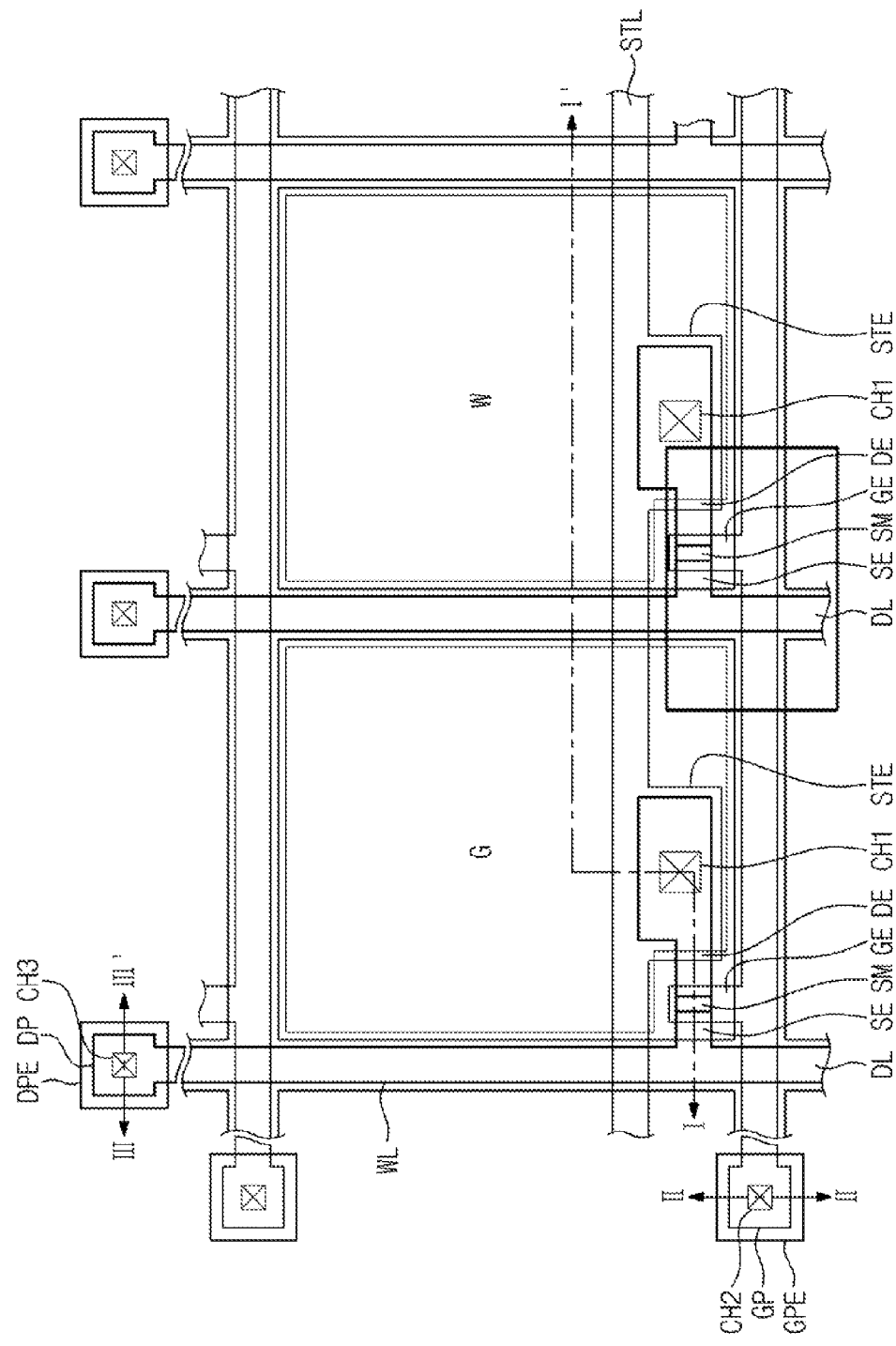
FIG. 6A is a plan view showing a portion P1 shown in FIG. 5.
Figure 6B:
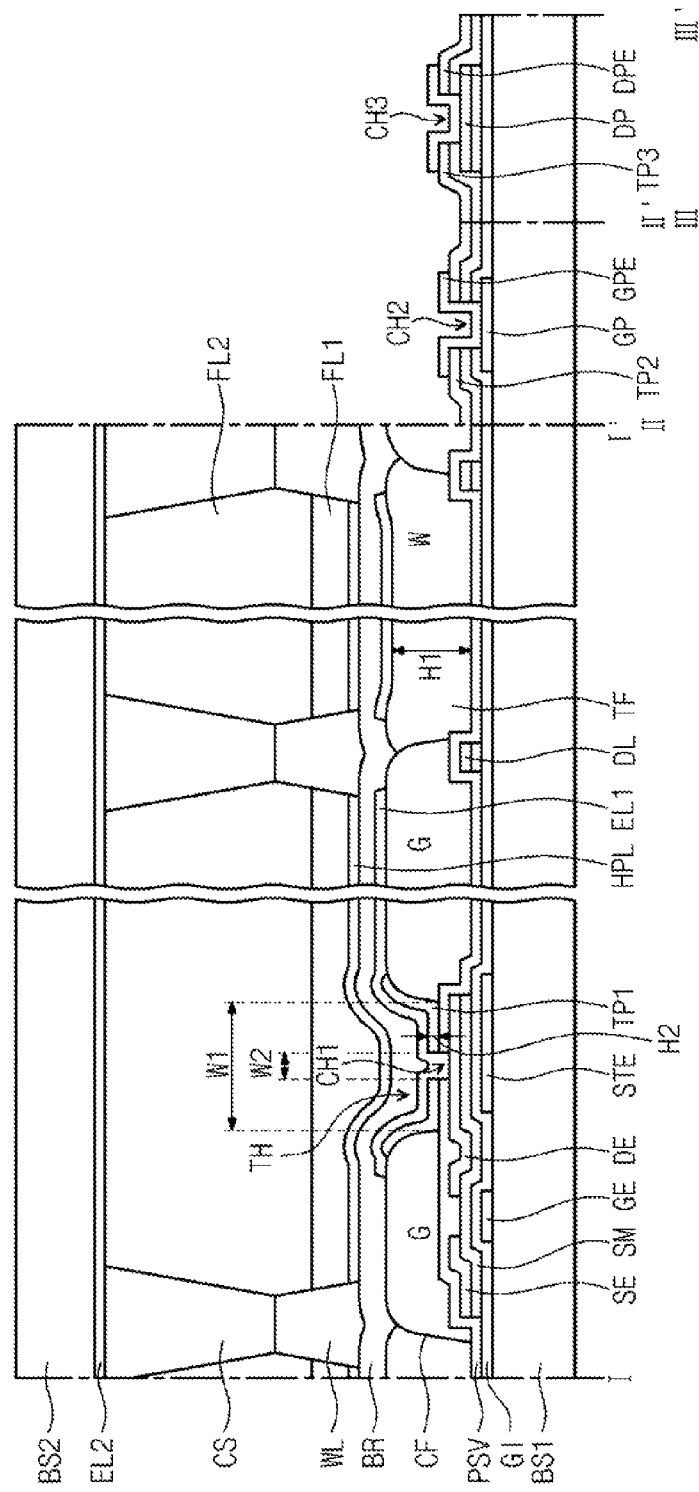
FIG. 6B is a cross-sectional view taken along lines I-I', II-II', and III-III' of FIG. 6A.

FIG. 5 is a plan view showing the electrowetting display device shown in FIG. 1. FIG. 6A is a plan view of a portion P1 of FIG. 5 showing a pixel PXL and an adjacent pixel. FIG. 6B is a cross-sectional view taken along lines I-I', II-II', and III-III' of FIG. 6A.

Referring to FIGS. 5, 6A, and 6B, an electrowetting display device includes the pixels PXL arranged in a matrix.

Each pixel PXL absorbs a specific wavelength of the light passing therethrough to display the specific color. For example, the pixels PXL may display red R, green G, blue B, or white W, but are not limited thereto. According to embodiments, the pixels PXL may be red R, green G, and blue B, or be yellow, cyan, and magenta in addition to red R, green G, blue B, and white W. In a present exemplary embodiment, the white W pixel is used to improve brightness, and is substantially transparent. The white W pixel transmits all wavelengths of the light passing therethrough, i.e., white light, to be displayed as white to the viewer.

The pixels PXL may be arranged in various shapes and orders according to the colors thereof. FIG. 5 shows pixel units having the red, green, blue, and white pixels arranged in two rows by two columns in which the pixel units are arranged in a matrix.

Referring to FIG. 6B, the electrowetting display device includes the array substrate, the opposite substrate, and the electrowetting layers FL1 and FL2 disposed between the array substrate and the opposite substrate.

Referring to FIGS. 5, 6A, and 6B, the array substrate includes the first base substrate BS1, a wiring part, the first electrode EL1 the switching device, the partition wall WL, and the hydrophobic layer HPL.

The first base substrate BS1 has a rectangular shape with a pair of long sides and a pair of short sides. The first base substrate BS1 includes a display area DA in which the image is displayed and a non-display area adjacent to the display area DA, in which the image is not displayed.

The wiring part applies signals to the switching devices and includes a plurality of gate lines GL, a plurality of data lines DL, a plurality of storage electrodes STE, and a plurality of storage lines STL.

The non-display area includes a first non-display area NDA1 and a second non-display area NDA2. The first non-display area NDA1 are disposed adjacent to one end of the gate lines GL and corresponds to one of the short sides of the first base substrate BS1, and the second non-display area NDA2 are disposed adjacent to one end of the data lines DL and corresponds to one of the long sides of the first base substrate BS2. The display area DA is partitioned into a plurality of pixel areas PA arranged in a matrix in which each pixel area PA corresponds to one pixel PXL. In a present exemplary embodiment, a row direction D1 of the matrix is substantially parallel to a long side of the first base substrate BS1, and thus a length of the row direction D1 of the base substrate BS1 is longer than that of a column direction D2 of the first base substrate BS1.

The gate lines GL are disposed on the first base substrate BS1 and extend in the row direction D1. The storage electrodes STE are spaced apart from the gate lines GL. The storage lines STL are substantially in parallel to the gate lines GL while extending in the row direction D1 and connected to the storage electrodes STE. The data lines DL extend in the column direction D2 crossing the row direction D1. A gate insulating layer GI is disposed on the first base substrate BS1 to cover the gate lines GL and the data lines DL are disposed on the gate insulating layer GI. The gate insulating layer GI may include silicon nitride or silicon oxide.

Each switching device is connected to a corresponding gate line of the gate lines GL and a corresponding data line of the data lines DL. The switching device includes a gate electrode GE, a semiconductor layer SM, a source electrode SE, and a drain electrode DE.

The gate electrode GE protrudes from the corresponding gate line of the gate lines GL. The gate electrode GE is formed of a conductive material, e.g., a metal. In detail, the gate electrode GE is formed of a metal, such as copper (Cu), molybdenum (Mo), aluminum (Al), tungsten (W), chromium (Cr), titanium (Ti), or alloys thereof.

The semiconductor layer SM is disposed on the gate electrode GE with the gate insulating layer GI interposed therebetween. The gate insulating layer GI is disposed on the whole surface of the first base substrate BS1 to cover the gate line GL and the gate electrode GE.

The semiconductor layer SM includes an active layer disposed on the gate insulating layer GI and an ohmic contact layer disposed on the active layer. The active layer corresponds to areas on which the source electrode SE and the drain electrode DE are formed, respectively, and an area between the source electrode SE and the drain electrode DE, when viewed in a plan view. The ohmic contact layer is provided between the active layer and the source electrode SE and between the active layer and the drain electrode DE.

The source electrode SE branches from the corresponding data line of the data line DL, and the drain electrode DE is spaced apart from the source electrode SE with the gate electrode GE interposed therebetween. When viewed in a plan view, the source electrode SE and the drain electrode DE partial overlap with the gate electrode GE.

The source electrode SE and the drain electrode DE are formed of a conductive material, e.g., a metal. In detail, the source electrode SE and the drain electrode DE are formed of a metal, such as copper (Cu), molybdenum (Mo), aluminum (Al), tungsten (W), chromium (Cr), titanium (Ti), or alloys thereof.

In a present exemplary embodiment, the source electrode SE and the drain electrode DE overlap with a portion of the semiconductor layer SM except for an area between the source electrode SE and the drain electrode DE. The area between the source electrode SE and the drain electrode DE serves as a channel portion, and an upper surface of the active layer is exposed therethrough. When the switching device is turned on, current flows between the source electrode SE and the drain electrode DE through the channel portion.

A passivation layer PSV is disposed on the channel portion to cover the channel portion and to protect the channel portion. The passivation layer PSV may include silicon nitride or silicon oxide.

A color filter CF, a transparent filter TF, and a first transparent contact hole pattern TP1 are provided on the first base substrate BS1, on which the switching device is formed, to correspond to each pixel.

The color filter CF and the transparent filter TF endow the pixels PXL with color. The color filter CF includes a red filter R, a green filter G and a blue filter B, and each pixel PXL is associated with one of the red, green, and blue filters R, G, and B so that each pixel has a color. Accordingly, the pixel having a red filter R, the pixel having a green filter G, and the pixel having a blue filter B are respectively defined as the red pixel, the green pixel, and the blue pixel. According to embodiments, the color filter CF may include other color filters representing other colors.

Each of the red, green, and blue filters R, G, and B is provided with a thru-hole TH to expose a portion of the passivation layer PSV. The thru-hole TH is located at a position corresponding to the drain electrode DE of the switching device. In a present exemplary embodiment, the thru-hole TH is circular with a first diameter D1, but the thru-hole TH is not limited to being circular. That is, the thru-hole TH may be rectangular with a width corresponding to the first diameter D1.

The transparent filter TF is disposed in those pixels PXL lacking a red filter R, a green filter G, or a blue color B. The transparent filter TP is formed of a transparent organic material and corresponds to the white color pixel W in a present exemplary embodiment. An end portion of the transparent filter TF, disposed adjacent to the color filter CF, overlaps a portion of the color filter CF to cover a portion of an upper surface of the color filter CF.

In addition, the red filter R, the green filter and the blue filter B and the transparent filter TF have the same height. The height of transparent filter TF is referred to as a first height H1, so that the color filters CF have the first height H1. This matches electrical properties of a pixel having a transparent filter TF to electrical properties of a pixel having a color filter CF. When the transparent filter TF has a different height from that of the color filter CF, the switching devices have different threshold voltages and different capacitances from each other. In an electrowetting display device according to a present exemplary embodiment, since the transparent filter TF has the same height as that of the color filter CF, the electrical properties in each pixel may be uniform.

The first transparent contact hole pattern TP1 is provided in the area in which the thru-hole TH is formed. All or a portion of the first transparent contact hole pattern TP1 is provided in the thru-hole TH. The first transparent contact hole pattern TP1 is disposed on the switching device to cover a portion of the switching device, e.g., a portion of the drain electrode DE, and is provided with a first contact hole CH1 to expose a portion of the drain electrode DE of the switching device. In a present exemplary embodiment, the first contact hole CH1 is circular with a second diameter D2, but the first contact hole CH1 is not limited to being circular. That is, the first contact hole CH1 may be rectangular with a width corresponding to the second diameter D2.

In this case, the first contact hole CH1 has a diameter less than the diameter of the thru-hole TH and is provided in the area in which the thru-hole TH is provided when viewed in a plan view. That is, the first diameter D1 is greater than the second diameter D2. The first diameter D1 of the thru-hole TH may be from about two times to about five times greater than the second diameter D2 of the first contact hole CH1. In a present exemplary embodiment, the first diameter D1 may be about 20 to about 30 micrometers and the second diameter D2 may be about 7 to about 10 micrometers.

The first transparent contact hole pattern TP1 may be formed by patterning the layer of the transparent filter TF and may be formed of the same material as that of the transparent filter TF. In this case, the first transparent contact hole pattern TP1 has a second height H2 less than the first height H1 of the transparent filter TF.

The first electrode EL1 is disposed on the color filter CF and the transparent filter TF in each pixel PXL and is connected to the switching device through the first contact hole CH1.

In the present exemplary embodiment, when the electrowetting display device is a transmissive type electrowetting display device, the first electrode EL1 may include a transparent conductive material, such as indium tin oxide (ITO), indium zinc oxide (IZO), or indium tin zinc oxide (ITZO). If the electrowetting display device is a reflective type electrowetting display device, the first electrode EL1 may include a reflective conductive material, such as a metal like aluminum. In addition, the first electrode EL1 may have a multi-layer structure including the transparent conductive material and the reflective conductive material. Further, when the electrowetting display device is a transflective type electrowetting display device, the first electrode EL1 includes a reflective portion to reflect external light and a transmissive portion to transmit the external light. In this case, the first electrode EL1 may have either a single-layer structure or a multi-layer structure of the transparent conductive material and the reflective conductive material.

In addition, although not shown in figures, a diffusion preventing layer may be disposed between the color filter CF and the first electrode EL1 to planarize an upper portion of the first base substrate BS1 on which the color filter CF is formed and prevent foreign substances from diffusing.

A barrier layer BR is disposed on the first base substrate BS1 on which the first electrode EL1 is formed. The barrier layer BR covers the display area DA. The barrier layer BR prevents portions of the electrowetting layers FL1 and FL2, e.g., a electrically conductive material, from making contact with the first electrode EL1 by diffusion or infiltration. If an electrically conductive material contacts the first electrode EL1, the first electrode EL1 may form a conducting connection with the electrically conductive material of the electrowetting layers FL1 and FL2.

The partition wall WL is disposed on the first base substrate BS1 on which the barrier layer BR is formed. The partition wall WL is formed on and protruded upward from the first base substrate BS1, to define each pixel area PA surrounded by the first base substrate BS1 and the partition wall WL. The partition wall WL restricts the flow of at least one of the first or second fluids FL1 and FL2.

The partition wall WL restricts the flow of at least one of the first or second fluids FL1 and FL2. To this end, at least a portion of the surface of the partition wall WL is hydrophilic, i.e., a property incompatible with the first fluid FL1. For example, an upper surface of the partition wall WL substantially parallel to the first base substrate BS1 and side surfaces connecting the upper surface to the first base substrate BS1 may be hydrophilic, or the side surfaces may be hydrophobic and the upper surface may be hydrophilic. Thus, the partition wall WL is not easily wetted by the first fluid FL1 which does not flow to an adjacent pixel area PA thereto even though the height of the partition wall WL is lower than that of the first fluid FL1. As a result, the first fluid FL1 is limited by the partition wall WL to flow in the space of each pixel area PA, so that the first fluid FL1 is prevented from flowing into the adjacent pixel area PA.

As described above, the partition wall WL may have a height sufficient to prevent the first fluid FL1 from flowing into the adjacent pixel area PA when the electronic device is driven, and thus the partition wall WL may have the height between a maximum height of the first fluid FL1 and half of the maximum height of the first fluid FL1.

The partition wall WL may be black. Accordingly, the partition wall WL can prevent crosstalk between adjacent pixels and prevent light passing through adjacent pixels from leaking. To this end, the partition wall WL may be formed of an organic material including a black pigment or dye.

The hydrophobic layer HPL is formed on the barrier layer BR in the space surrounded by the partition wall WL. The hydrophobic layer HPL covers the pixel areas PA except for the area in which the partition wall WL is formed. The hydrophobic layer HPL is formed from a fluorine compound. The compound may be a polymer compound represented by the following chemical formula 1, such as —$C_xF_y$—, $C_xF_yH_z$—, —$C_xF_yC_zH_p$—, —$C_xF_yO$—, —$C_xF_yN(H)$—, etc., where each of x, y, x, p, n and m is an integer greater than or equal to 1, or an amorphous fluorine compound such as AF1600 of DuPont. In the chemical formula 1, m and n is a natural number.

[Chemical formula 1]

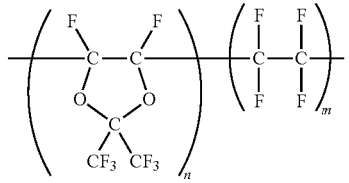

The hydrophobic layer HPL is formed to have a thickness equal to or less than 400 nm. In a present exemplary embodiment, the hydrophobic layer HPL may be formed to have a thickness less than or equal to about 300 nm, less than or equal to about 250 nm, or less than or equal to about 200 nm. For example, the hydrophobic layer HPL may have a thickness of about 150 nm to about 250 nm. In the case of a thin hydrophobic layer HPL, the hydrophobic layer HPL may not be sufficiently hydrophobic to repel the first fluid FL1 and attract the second fluid FL2. The thickness of the hydrophobic layer HPL should be thin enough to reduce the amount of a material used to form the hydrophobic layer HPL but thick enough to be sufficiently hydrophobic.

In addition, the opposite substrate includes a second base substrate BS2 facing the first base substrate BS1, the second electrode EL2, and the column spacer CS.

The second electrode EL2 is disposed on the second base substrate BS2. The second electrode EL2 is disposed on the display area and may be integrally formed as a single unitary unit to cover the pixels PXL. Alternatively, there may be a plurality of second electrodes EL2 disposed in each pixel PXL, in which case the second electrodes EL2 are connected to each other. The second electrodes EL2 may be connected via the second fluid FL2.

The second electrode EL2 is formed of a transparent conductive material, e.g., indium tin oxide ITO, indium zinc oxide IZO, or indium tin zinc oxide ITZO.

In a present exemplary embodiment, the first electrode EL1 and the second electrode EL2 are respectively disposed on the first base substrate BS1 and the second base substrate BS2, but embodiments are not limited thereto. That is, both the first and second electrodes EL1 and EL2 may be formed on the first base substrate BS1. In this case, the second electrode EL2 may be positioned adjacent to at least one side of the first electrode EL1, and be electrically insulated from the first electrode EL1. For example, the first electrode EL1 may be provided in a portion of the pixel area PA surrounded by the partition wall WL and the second electrode EL2 may be provided in a remaining portion of the pixel area PA spaced apart from the first electrode EL1. Alternatively, the first electrode EL1 may be provided to cover the pixel area PA and the second electrode EL2 may be disposed on the inner surface of the partition wall WL spaced apart from the first electrode EL1.

The column spacer CS is disposed on and protruded from the second base substrate BS2. The column spacer CS is disposed at a position corresponding to the partition wall WL so that an upper surface thereof makes direct contact with the partition wall WL, so that the column spacer CS in cooperation with the partition wall WL can maintain a distance, hereinafter, referred to as cell gap, between the first base substrate BS1 and the second base substrate BS2. The cell gap is set so that the first fluid FL1 and the second fluid FL2 provided in each pixel may flow smoothly. In particular, the cell gap may have a value greater than the maximum height of the first fluid FL1 while the first fluid FL1 flows.

FIGS. 7A to 7D are perspective views showing the partition wall WL and the column spacer CS. For the convenience of explanation, FIGS. 7A to 7D show only the partition wall WL and the column spacer CS corresponding to the partition wall WL.

Figure 7A:
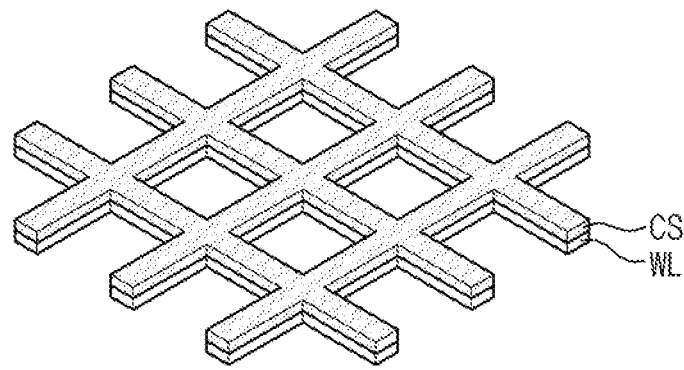
FIGS. 7A to 7D are perspective views showing partition walls and column spacers.

Referring to FIG. 7A, when viewed in a plan view, the column spacer CS is provided at a position corresponding to the partition wall WL, so that the column spacer CS has the same shape as the partition wall WL. In this case, a space defined by the first base substrate BS1, the partition wall WL, and the column spacer CS is provided for each pixel, and the first and second fluids FL1 and FL2 flow in the space defined by the first base substrate BS1, the partition wall WL, and the column spacer CS.

Figure 7B:
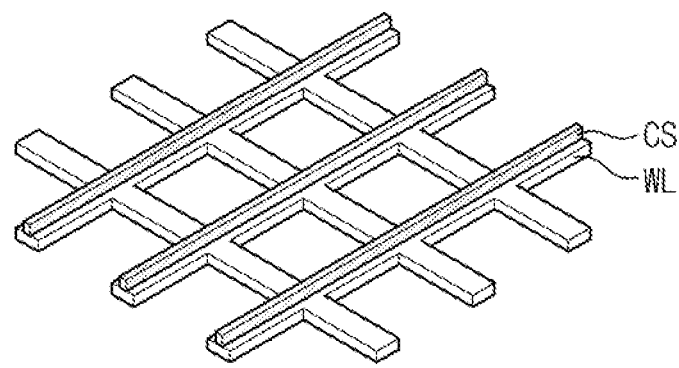
Figure 7C:
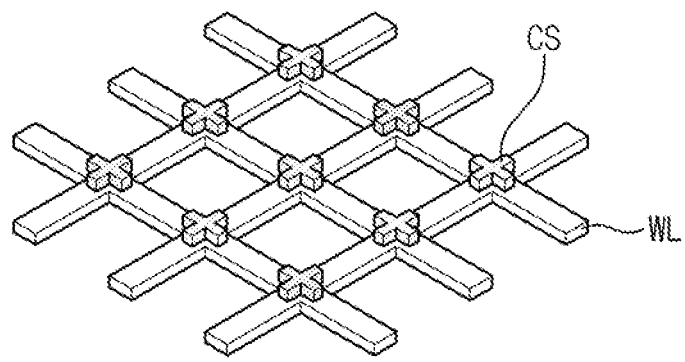
Figure 7D:
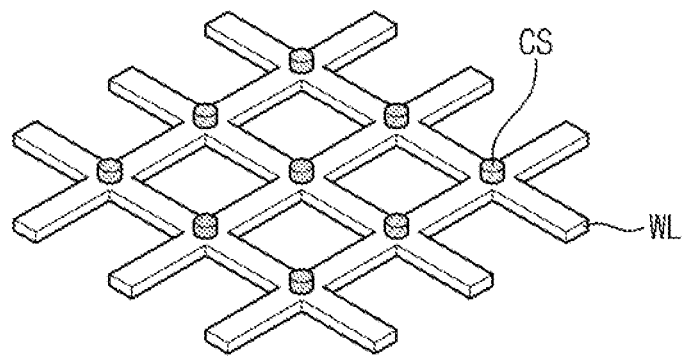

Alternatively, the column spacer CS may be formed on portions of the partition wall WL to partially overlap with the partition wall WL. A plurality of column spacers CS are provided and are spaced apart from each other by a predetermined distance such that several pixels PXL are positioned between two adjacent column spacers CS. As shown in FIGS. 7B to 7D, the column spacers CS are disposed on the partition wall WL spaced apart from each other. When viewed in a plan view, the column spacer CS may have various shapes, e.g., a line, a cross, a circle, etc. In this case, the first fluid FL1 flows in the space defined by the first base substrate BS1 and the partition walls WL in each pixel PXL, and the second fluid FL2 can flow to an adjacent pixel PXL through an area between the column spacers CS.

The column spacer CS has the height greater than that of the partition wall WL, e.g., from about two times to about four times greater than the height of the partition wall WL. In detail, when the partition wall WL has the height of about 4 to about 6 micrometers, the column spacer CS has the height of about 9 to about 17 micrometers. The partition wall WL may have a height of about 5 micrometers and the column spacer CS may have a height of about 15 micrometers. In this case, the cell gap is in a range of about 15 to about 21 micrometers. Since an electrowetting display device according to embodiments has a reduced consumption of the first and second fluids FL1 and FL2 and more easily formed partition walls WL and column spacers CS, the manufacturing process thereof is simplified and the manufacturing cost is reduced.

In a present exemplary embodiment, the distance of the cell gap, the height of the partition wall WL, and the height of column spacer CS are determined in consideration of not only the properties, volumes, and flow of the first and second fluids FL1 and FL2, but also in consideration of the manufacturing convenience of the partition wall WL and the column spacer CS.

In addition, referring again to FIG. 5, the wiring part further includes a gate pad part GPP provided in the first non-display area NDA1 and a data pad part DPP provided in the second non-display area NDA2. The gate pad part GPP and the data pad part DPP are connected to external wirings (not shown) to apply the gate signals to the gate lines GL and the data signals to the data lines DL.

Referring again to FIGS. 6A and 6B, the gate pad part GPP includes a gate pad GP and a gate pad electrode GPE connected to the gate pad GP. The gate pad GP is connected to the gate line GL. The gate pad electrode GPE is connected to the gate pad GP through a second contact hole CH2 formed through the gate insulating layer GI, the passivation layer PSV, and a second transparent contact hole pattern TP2.

The data pad part DPP includes a data pad DP and a data pad electrode DPE connected to the data pad DP. The data pad DP is connected to the data line and disposed on the gate insulating layer GI. The data pad electrode DPE is connected to the data pad DP through a third contact hole CH3 formed through the passivation layer PSV and a third transparent contact hole pattern TP3.

The second transparent contact hole pattern TP2 and the third transparent contact hole pattern TP3 may be formed by patterning the same layer as that of the transparent filter TF and the first transparent contact hole pattern TP1 and are formed of the same material as that of the transparent filter TF and the first transparent contact hole pattern TP1. In this case, the second transparent contact hole pattern TP2 and the third transparent contact hole pattern TP3 have a height substantially the same as the second height H2 of the first transparent contact hole pattern TP1.

In a present exemplary embodiment, the gate pad part GPP includes the gate pad GP and the gate pad electrode GPE, but it is not limited thereto. That is, the gate pad part GPP may include a gate driver circuit connected to the gate lines GL. In this case, the gate driver circuit is disposed in the first non-display area NDA1 and sequentially applies the gate signals to the gate lines GL. The gate driver circuit may include a plurality of amorphous silicon type transistors directly formed on the first base substrate BS1. The gate driver circuit may be substantially simultaneously formed with the pixels on the first base substrate BS1 through a thin film process.

In an electrowetting display device according to a present exemplary embodiment, the color filter CF is disposed on the first base substrate BS1, and thus reducing color crosstalk in the images. In a conventional electrowetting display device, the first fluid serving as the optical switch is disposed on the first base substrate and the color filter is disposed on the second base substrate, so that the color crosstalk occurs due to parallax. According to an electrowetting display device according to a present exemplary embodiment, however, since the first fluid FL1 serving as the optical switch and the color filter CF are disposed on the first base substrate BS1, color crosstalk may be reduced.

Figure 8:
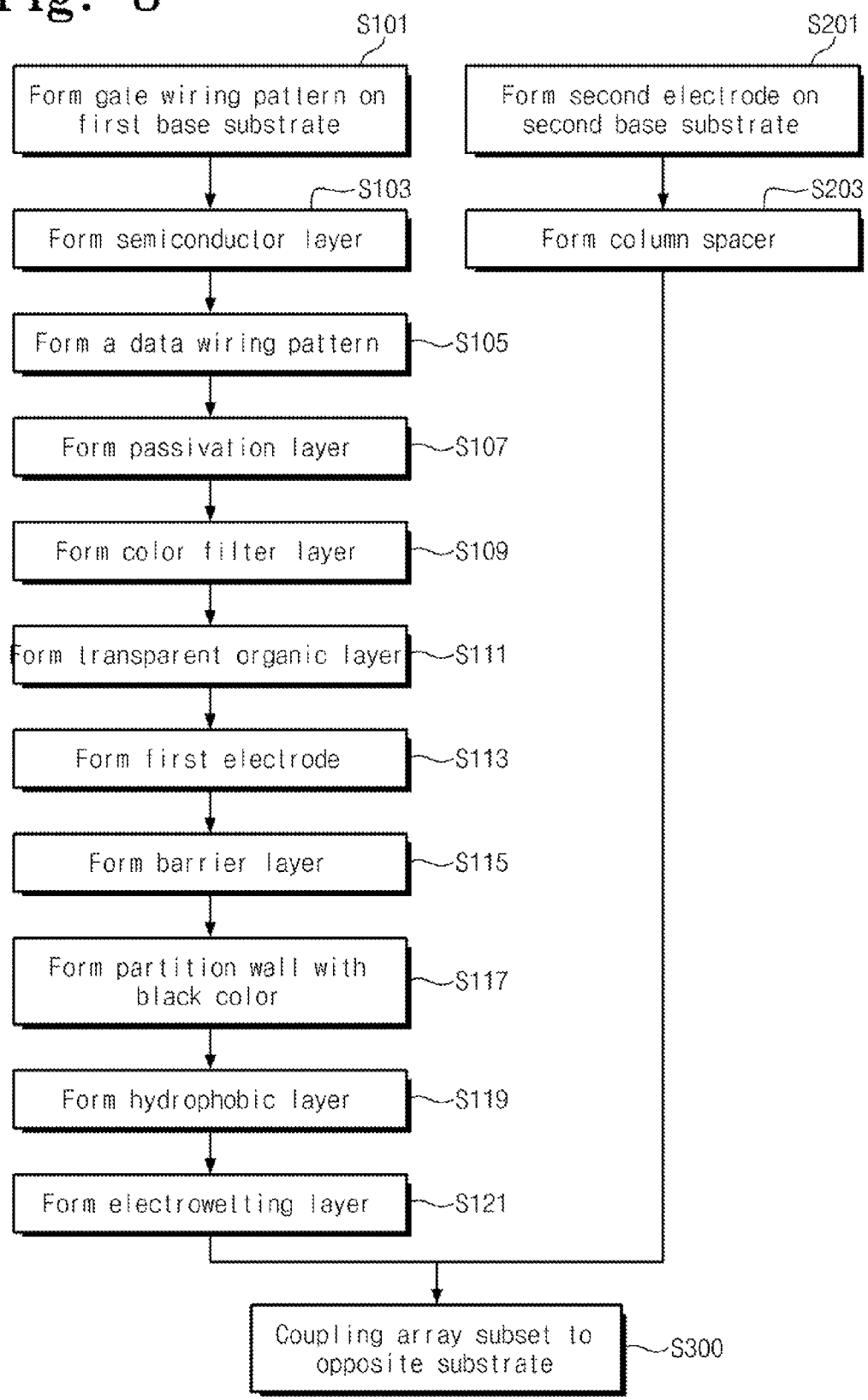
FIG. 8 is a flowchart of a method of manufacturing the electrowetting display device shown in FIGS. 5, 6A, and 6B.

FIG. 8 is a flowchart of a method of manufacturing the electrowetting display device shown in FIGS. 5, 6A, and 6B. The electrowetting display device shown in FIGS. 5, 6A, and 6B may be manufactured by manufacturing the array substrate, manufacturing the opposite substrate, and forming the electrowetting layers FL1 and FL2 between the array substrate and the opposite substrate.

Referring to FIG. 8, the array substrate is manufactured by forming the wiring part and the switching device on the first base substrate BS1 (steps S101, S103, and S105, respectively), forming the passivation layer PSV, the color filter CF, and the transparent filter TF (steps S107, S109, and S111, respectively), forming the first electrode EL1 (step S113), forming the barrier layer BR (step S115), forming the partition wall WL with the black color (step S117), and forming the hydrophobic layer HPL (step S119). The electrowetting layers FL1 and FL2 are formed on the array substrate (step S121). The wiring part and the switching device are formed by forming a gate wiring part on the first base substrate BS1 (step S101), forming the semiconductor layer (step S103), and forming a data wiring part (step S105).

The opposite substrate is manufactured by forming the second electrode EL2 on the second base substrate BS2 (step S201) and forming the column spacer CS (step S203). Steps S201 and S203 may be performed in parallel with steps S101 to S121. Then, the array substrate is coupled to the opposite substrate (step S300), so that the electrowetting display device is manufactured.

FIGS. 9A to 9I are cross-sectional views illustrating a method shown in FIG. 8 of manufacturing the electrowetting display device shown in FIGS. 6A and 6B, which are taken along lines I-I', II-II', and III-III' shown in FIG. 6A, with reference to the steps of FIG. 8, and FIGS. 10A to 10C are cross-sectional views showing a sixth mask process.

Figure 9A:
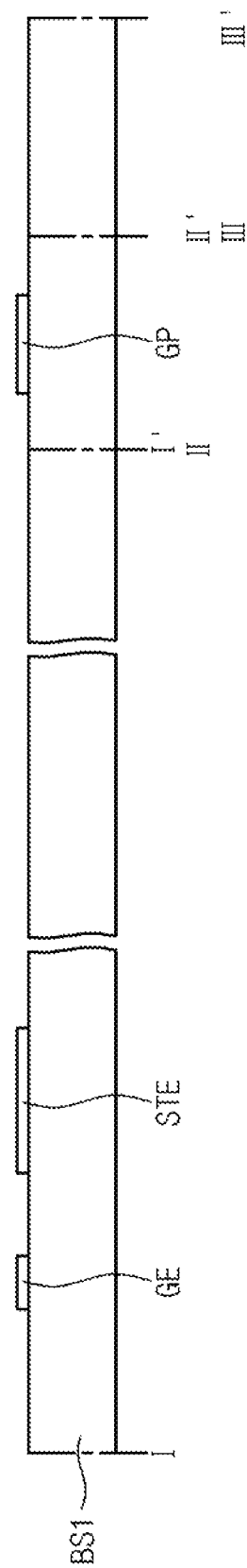

Referring to FIG. 9A, a gate line pattern is formed on the first base substrate BS1, which is formed of the transparent insulating material, using a first conductive material (S101). The gate line pattern includes the gate electrode GE, the gate line GL, the storage electrode STE, the storage line (not shown), and the gate pad GP. The gate electrode GE, the gate line GL, the storage electrode STE, and the storage line are formed in the display area DA and the gate pad GP is formed in the first non-display area NDA1 of the non-display area.

The gate line pattern is formed by depositing a first conductive material over the whole surface of the first base substrate BS1 to form a first conductive layer, and patterning the first conductive layer through a photolithography process using a first mask (not shown). In an exemplary embodiment, the first conductive material includes a metal, such as copper (Cu), molybdenum (Mo), aluminum (Al), tungsten (W), chromium (Cr), etc., and may have a either a single-layer structure or a multi-layer structure, or be an alloy structure. For example, the first conductive layer may have a triple-layer structure of molybdenum-aluminum-molybdenum (Mo—Al—Mo) or be an alloy of molybdenum-aluminum.

Figure 9B:
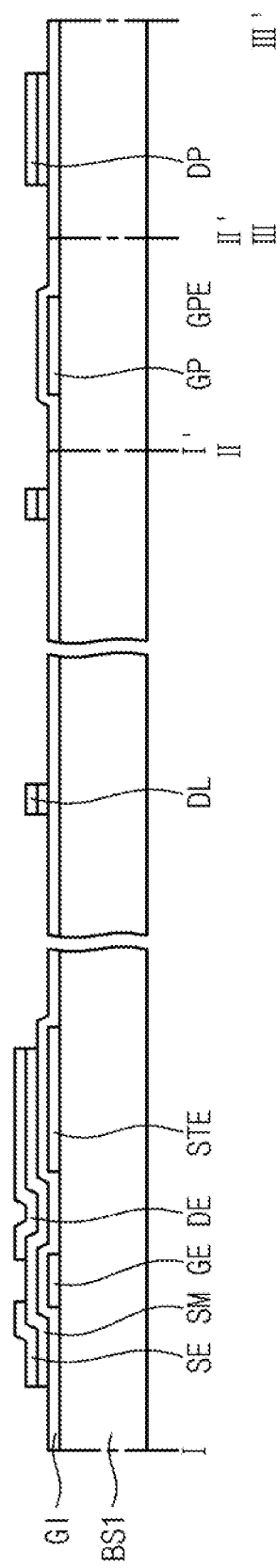

Referring to FIG. 9B, the gate insulating layer GI is formed on the first base substrate BS1 to cover the gate line pattern and the semiconductor layer SM is formed on the gate insulating layer GI (S103, S105). The semiconductor layer SM includes doped or non-doped silicon or semiconductor oxide. The semiconductor layer SM is disposed on the gate electrode GE and overlaps at least a portion of the gate electrode GE when viewed in a plan view.

A data line pattern is formed on the semiconductor layer SM. The data line pattern includes a data line DL, a source electrode SE, a drain electrode DE, and a data pad DP. The data line DL, the source electrode SE, and the drain electrode DE are formed in the display area DA and the data pad DP is formed in the second non-display area NDA2 of the non display area.

According to an exemplary embodiment, the semiconductor layer SM and the data line pattern may be formed by a single photolithography process with a second mask. The second mask may be a slit mask or a half-tone mask, and hereinafter, a photolithography process using a slit mask will be described as an example.

The gate insulating layer GI, a semiconductor thin layer, and a second conductive layer are sequentially deposited on the first base substrate BS1 on which the gate line pattern is formed.

The second conductive layer is formed of a second conductive material, and the second conductive material includes a metal, such as copper (Cu), molybdenum (Mo), aluminum (Al), tungsten (W), chromium (Cr), etc. In addition, the second conductive layer may have either a single-layer structure or a multi-layer structure, or be an alloy. Then, a photosensitive layer is formed on the first base substrate BS1 and light is irradiated onto the photosensitive layer using the second mask to create an exposed photosensitive layer. The second mask is slit mask that includes a block area that blocks the light, a slit area whose slit pattern transmits a portion of the light and blocks the remaining portion of the light, and a transmission area that transmits all of the light. Thus, only the light passing through the second mask is irradiated onto the photosensitive layer. After the exposed photosensitive layer is developed, a photosensitive layer pattern remains in the block area and the slit area, the photosensitive layer is removed in the transmission area, and thus the surface of the second conductive layer is exposed. In this case, the photosensitive layer pattern in the slit area has a thickness less than a thickness of the photosensitive layer pattern in the block area since the amount of the light passing through the slit area is greater than the amount of the light passing through the block area. Then, the semiconductor thin layer and the second conductive layer are selectively removed by a photolithography process using the photosensitive layer pattern as a mask. Accordingly, the semiconductor layer formed of the semiconductor thin layer and the second conductive pattern formed of the second conductive material are formed above the gate line GL. Next, the photosensitive layer pattern is removed by an ashing process or an etch back process, and is completely removed from the area to which a diffraction exposure is applied, thus exposing a portion of the surface of the second conductive pattern, and a third photosensitive pattern remains. Then, an upper portion of the semiconductor layer and the second conductive pattern are removed by a photolithography process using the third photosensitive pattern and the third photosensitive pattern is removed. As a result, the semiconductor layer SM, the source electrode SE, the drain electrode DE, the data line DL, and the data pad DP are formed substantially simultaneously with the channel portion between the source electrode SE and the drain electrode DE. In a present exemplary embodiment, a positive photoresist layer is used as the photosensitive layer so that the exposed portion of photosensitive layer is removed, but the photosensitive layer is not limited to a positive photoresist layer. That is, a negative photoresist layer can be used as the photosensitive layer so that the non-exposed portion of photosensitive layer is removed.

However, a method of forming the semiconductor layer SM and the data line pattern is not limited thereto. For example, the semiconductor layer SM may be formed by a photolithography process, and then the data line pattern may be formed by a photolithography process.

Figure 9C:
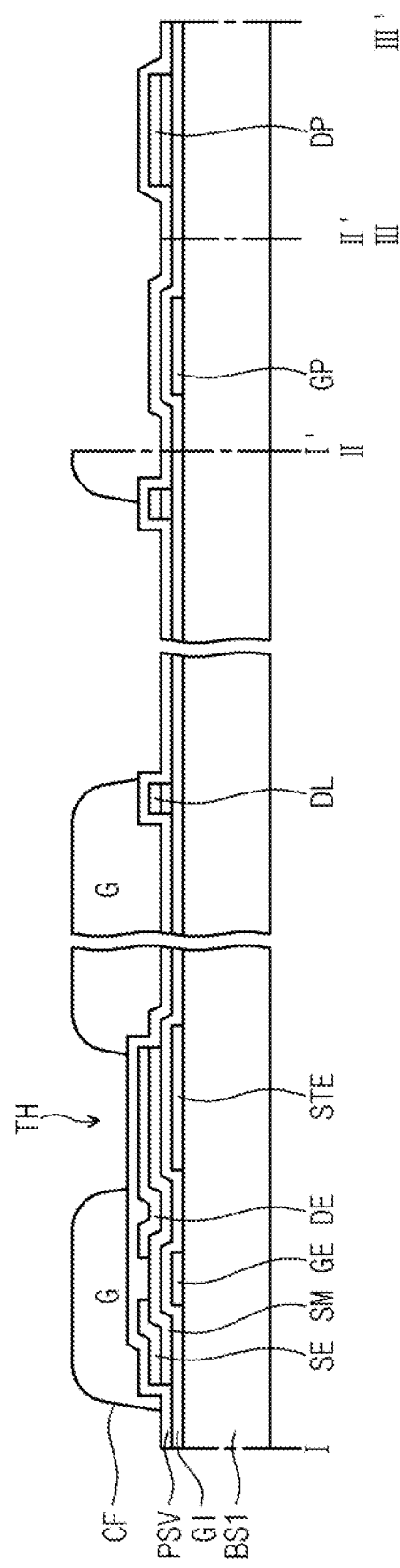

Referring to FIG. 9C, the passivation layer PSV and the color filter CF are formed on the first base substrate BS1 on which the data line pattern is formed (S107, S109).

The passivation layer PSV is formed over the whole surface of the first base substrate BS1 to cover the switching device, the gate pad GP, and the data pad DP.

The color filter CF is formed on the first base substrate BS1 on which the passivation layer PSV is formed. The color filter CF is formed in the display area DA and is provided with the thru-hole TH formed therethrough in the area corresponding to the drain electrode DE to expose a portion of the passivation layer PSV. The thru-hole has the first diameter.

In an electrowetting display device according to a present exemplary embodiment, the color filter CF includes a red filter R, a green filter G, and a blue filter B, and each of the red, green, and blue filters R, G, and B is formed by coating a photosensitive organic material having a corresponding color thereto, and exposing and developing the photosensitive organic material using a photolithography process. The color filter CF may include pigments or dyes corresponding to red, green, and blue. FIG. 9C shows areas in which only the green filter G is formed.

The red, green, and blue filters R, G, and B may be formed in various ways. For example, the red, green, and blue filters R, G and B may be formed in the order of the green filter G, the red filter R, and the blue filter B. The green filter G is formed by a photolithography process using a third mask, the red filter R is formed by a photolithography process using a fourth mask, and the blue filter B is formed by a photolithography process using a fifth mask. In this case, the third, fourth, and fifth masks differ from each other, but three-time photolithography processes may be performed using only one mask. That is, the green, red, and blue filters G, R, and B may be formed by performing the three-time photolithography processes while changing the position of the one mask.

In addition, if an additional color filter is added to the color filter CF, an additional photolithography process may be performed.

Referring to FIG. 9D, the transparent filter TF, the first transparent contact hole pattern TP1, the second transparent contact hole pattern TP2, and the third transparent contact hole pattern TP3 are formed on the first base substrate BS1 (S111).

The transparent filter TF is formed on the passivation layer PSV of the first base substrate BS1. The transparent filter TF is formed in the display area DA in which the color filter CF is not formed. The transparent filter TF has the thru-hole TH (not shown) to expose a portion of the passivation layer PSV in the area corresponding to the drain electrode DE of the switching device.

The first transparent contact hole pattern TP1 is provided in the area in which the thru-hole TH is formed. All or a portion of the first transparent contact hole pattern TP1 is disposed in the thru-hole TH and is provided with the first contact hole CH1 to expose a portion of the drain electrode DE. The first contact hole CH1 has the second diameter D2 less than the first diameter D1.

In addition, the second transparent contact hole pattern TP2 and the third transparent contact hole pattern TP3 are respectively formed on the gate pad part GPP and the data pad part DPP of the non-display area. The second transparent contact hole pattern TP2 is provided with the second contact hole CH2 to expose a portion of the gate pad GP and the third transparent contact hole pattern TP3 is provided with the third contact hole CH3 to expose a portion of the data pad DP.

The transparent filter TF, the first transparent contact hole pattern TP1, the second transparent contact hole pattern TP2, and the third transparent contact hole pattern. TP3 are formed by coating a photosensitive transparent organic material on the whole surface of the first base substrate BS1 and performing a single photolithography process using a sixth mask. The sixth mask may be a slit mask or a half-tone mask, and hereinafter, the photolithography process using the slit mask will be described with reference to FIGS. 10A to 10C.

Figure 10A:
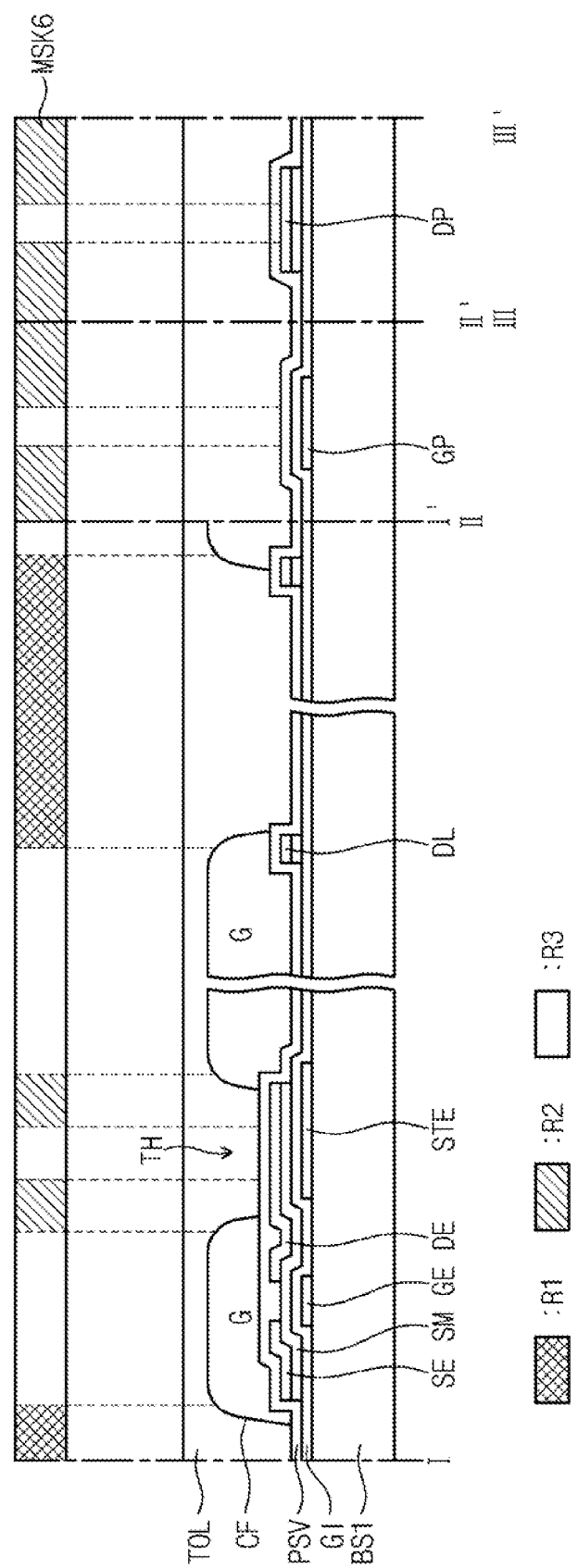

Referring to FIG. 10A, the photosensitive transparent organic material is coated on the first base substrate BS1 on which the passivation layer PSV and the color filter CF are formed to form a transparent organic layer TOL. Then, light is irradiated onto the transparent organic layer TOL through the sixth mask MSK6 to expose the transparent organic layer TOL. Since the sixth mask MSK6 is a slit mask, the sixth mask MSK6 includes a first region R1 that blocks all the light, a second region R2 that transmits a portion of the light and blocks the remaining portion of the light with the slit pattern, and a third region R3 that transmits all the light, and thus the light passing through the sixth mask MSK6 is irradiated onto the transparent organic layer. The first, second, and third regions R1, R2, and R3 correspond to the display area DA. In detail, the first region R1 corresponds to the area in which the transparent filter TF is formed, the second region R2 corresponds to the areas in which the first, second and third transparent contact hole patterns TP1, TP2 and TP3 are formed, respectively. The third region R3 corresponds to areas in which the first, second, and third contact holes CH1, CH2, and CH3 are formed, respectively. Therefore, the upper surface of the first base substrate BS1 is positioned under the first, second, and third regions R1, R2, and R3 and divided into areas respectively corresponding to the first, second, and third regions R1, R2, and R3. Thus, the area of the first base substrate BS1 are referred to as the first, second, and third regions R1, R2, and R3, respectively.

Then, when the exposed transparent organic layer TOL is developed, a transparent organic layer pattern TOLP is formed in the first and second regions R1 and R2 as shown in FIG. 10B. That is, the transparent filter TF is removed in the first region R1, the first, second, and third transparent contact hole patterns TP1, TP2, and TP3 are removed in the second region R2, and the transparent organic layer is removed in the third region R3, and thus the passivation layer PSV is exposed. In this case, the transparent organic layer pattern in the second region R2 has a height less than that of the transparent organic layer pattern in the first region R1 since the amount of the light passing through the second region R2 is greater than the amount of the light passing through the first region R1. That is, referring to the height of the transparent organic pattern in the first region R1 as the first height H1 and referring to the height of the transparent organic pattern in the second region R2 as the second height H2, the first height H1 is greater than the second height H2. In a present exemplary embodiment, a positive photoresist layer is used as the sixth mask MSK6 such that the exposed portion of the transparent organic layer is removed, but the sixth mask MSK6 is not limited to a positive photoresist layer. That is, a negative photoresist layer may be used as the sixth mask MSK6 such that the non-exposed portion of the transparent organic layer is removed.

Referring to FIG. 10C, the passivation layer PSV and the gate insulating layer GI is selectively etched by a photolithography process using the transparent organic layer pattern TOLP as a mask. Thus, the first contact hole CHI through which a portion of the drain electrode DE is exposed, the second contact hole CH2 through which a portion of the gate pad GP is exposed, and the third contact hole CH3 through which a portion of the data pad DP is exposed are formed.

The transparent filter TF has the same height as that of the color filter CF. In a conventional electrowetting display device, the white filter and the contact holes are formed by performing a two-step photolithography process, but, in a present exemplary embodiment, the transparent filter TF and first to third contact holes CH1 to CH3 may be formed with the transparent organic layer pattern TOLP by performing a one-step photolithography process. Thus, the manufacturing process of the electrowetting display device is simplified, and the process time and cost of the electrowetting display device may be reduced.

In addition, in a conventional electrowetting display device, a line width achieved by a photolithography process is limited by a composition of the color filter CF. Accordingly, although the contact holes are formed together with the color filter, the contact hole is formed to have a larger than desired size. According to an electrowetting display device in a present exemplary embodiment, however, the contact holes may be substantially simultaneously formed with the transparent organic layer pattern since the transparent organic material is used to form the transparent organic layer, in which the line width achieved by the photolithography process is less than that of the color filter CF. In this case, the contact holes may be formed to have a desired diameter regardless of the composition of the color filter CF and the line width. The organic layer for the color filter CF and the transparent organic layer have different functional groups, and thus the organic layers for the color filter CF and the transparent organic layer are exposed to light with different wavelengths in different exposure chambers when the photolithography process is applied to the organic layers.

Figure 9E:
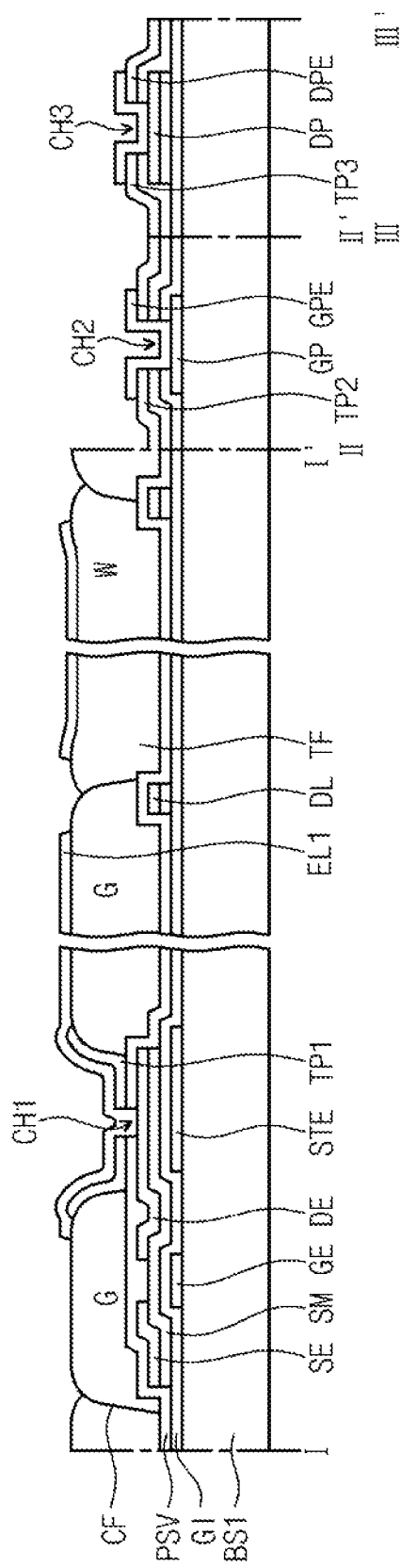

Referring to FIG. 9E, the first electrode EL1, the gate pad electrode GPE, and the data pad electrode DPE are formed on the first base substrate BS1 on which the color filter CF and the transparent organic layer pattern are formed (S113).

The first electrode EL1 is disposed in the pixel area PA, and the gate pad electrode GPE and the data pad electrode DPE are respectively formed in the gate pad part GPP and the data pad part DPP.

The first electrode EL1, the gate pad electrode GPE, and the data pad electrode DPE are formed by forming a conductive layer on the color filter CF and the transparent organic layer pattern using a conductive material and patterning the conductive layer through a photolithography process using a seventh mask.

The conductive layer may include a transparent conductive material. In particular, the first electrode EL1 may be formed of a transparent conductive oxide, such as indium tin oxide (ITO), indium zinc oxide (IZO), indium tin zinc oxide (ITZO), etc. According to embodiments, the conductive layer may include a reflective conductive material, e.g., a metal like aluminum. In addition, the conductive layer may be a multi-layer structure of a transparent conductive material and a reflective material. Further, if the first electrode EL1 includes a reflective portion to reflect external light and a transmissive portion to transmit external light, the first electrode EL1 may have either a single-layer structure or a multi-layer structure of transparent conductive material or reflective conductive material.

The first electrode EL1 is connected to the drain electrode DE through the first contact hole CH1. The gate pad electrode GPE is connected to the gate pad GP through the second contact hole CH2, and the data pad electrode DPE is connected to the data pad DP through the third contact hole CH3.

Referring to FIG. 9F, the barrier layer BR is formed on the first base substrate BS1 on which the first electrode EL1 is formed (S115). The barrier layer BR covers the display area DA except for the first and second non-display areas NDA1 and NDA2. The barrier layer BR is formed by depositing an insulating material on the first base substrate BS1 using a vapor deposition apparatus and a shadow mask. The shadow mask is located at a position corresponding to the first and second non-display areas NDA1 and NDA2 in which the barrier layer BR is not formed to cover the first base substrate BS1. Thus, the barrier layer BR is formed only in the display area DA.

The method of forming the barrier layer BR is not limited thereto. That is, the barrier layer BR may be formed with a photolithography process. However, when the barrier layer BR is formed with a shadow mask, the process of forming the barrier layer BR is simplified, and the process time and cost is reduced since a high-priced mask need not be used and a photolithography process need not be performed.

Referring to FIG. 9G, the partition wall WL is formed on portions of the display area DA and the first and second non-display areas NDA1 and NDA2 of the first base substrate BS1 on which the barrier layer BR is formed (S117).

The partition wall WL is formed using a black photosensitive organic material. The partition wall WL is formed by a photolithography process using an eighth mask. To this end, the black photosensitive organic material is patterned by the photolithography process and cured by a baking process, thereby forming the partition wall WL.

In a present exemplary embodiment, the photosensitive organic material is exposed to light having an energy of about 80 mJ with a mask having the line width of about 12 micrometers, soft baked at about 100° Celsius for about 150 seconds, developed for about 110 seconds, and cured at about 230° Celsius for about 30 minutes. As a result, a partition wall WL having a height of about 5 micrometers is formed.

At least a portion of the surface of the partition wall WL is surface-treated to be hydrophilic, e.g., a property incompatible with the first fluid FL1. For example, the upper surface of the partition wall WL that is substantially parallel to the first base substrate BS1 and the side surfaces connecting the upper surface and the first base substrate BS1 may be surface-treated to be hydrophilic, or the upper surface and the side surfaces may be surface-treated so that the side surfaces are hydrophobic and the upper surface is hydrophilic.

Referring to FIG. 9H, the hydrophobic layer HPL is formed on the first base substrate BS1 on which the partition wall WL is formed (S119). The hydrophobic layer HPL is formed in the pixel area PA surrounded by the partition wall WL. The hydrophobic layer HPL is formed from a fluorine compound so that the surface of the hydrophobic layer HPL is hydrophobic.

The hydrophobic layer HPL may be formed in the pixel area PA surrounded by the partition wall WL by a method such as a spray method, a patch slit method, or an inkjet method, after which the hydrophobic material is cured. A separate mask is not required to form the hydrophobic material in the pixel area PA using the aforementioned methods, but embodiments are not limited to these methods.

The hydrophobic layer HPL covers the pixel area PA except for the area in which the partition wall WL is formed. The hydrophobic layer HPL has a thickness less than or equal to about 400 nm. In a present exemplary embodiment, the hydrophobic layer HPL may be formed to have the thickness less than or equal to about 300 nm, less than or equal to about 250 nm, or less than or equal to about 200 nm.

Figure 9I:
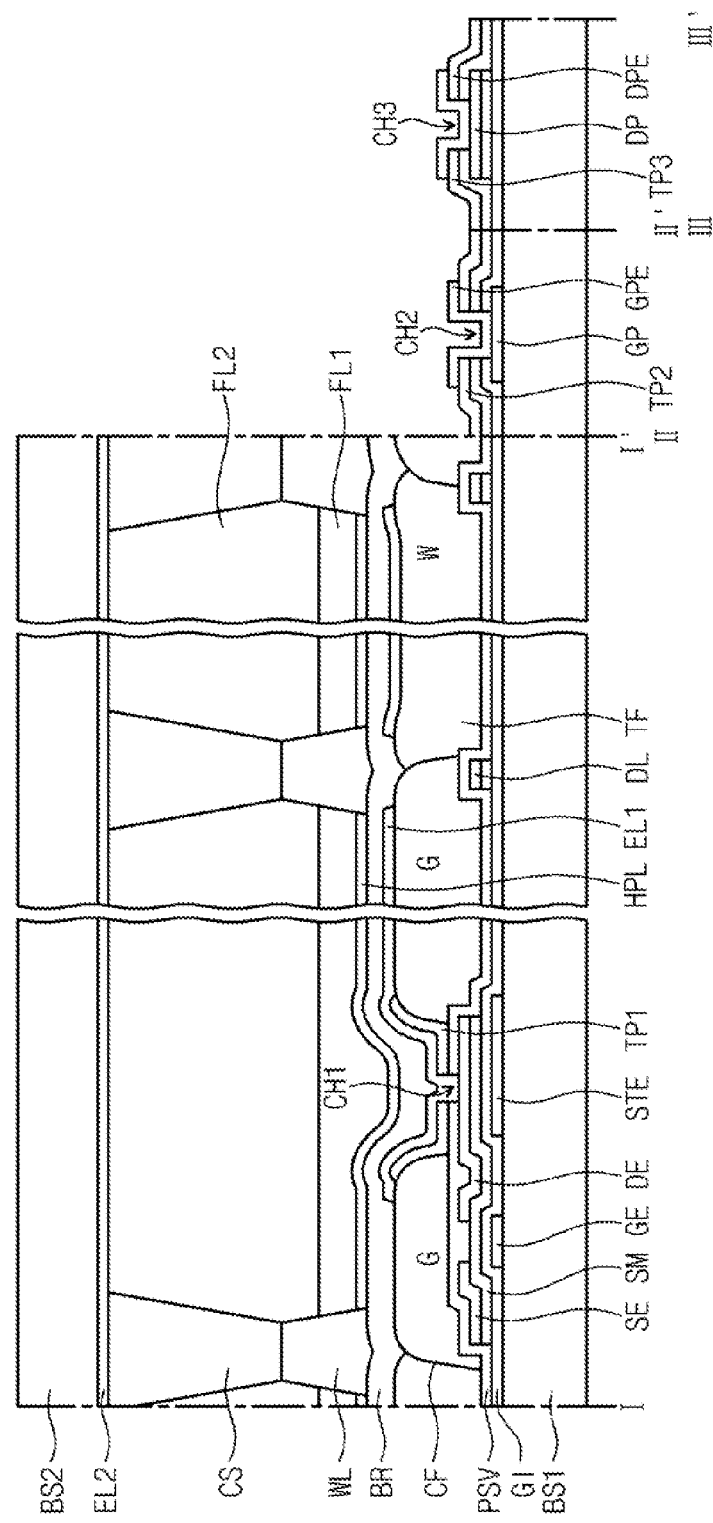

Referring to FIG. 9I, the electrowetting layers FL1 and FL2 are formed on the first base substrate BS1 (S121). The electrowetting layers FL1 and FL2 are formed by coating the first fluid FL1 and the second fluid FL2 on the first base substrate BS1. The coating of the first and second fluids FL1 and FL2 is achieved by dipping the first base substrate, on which the partition wall WL is formed, into the first fluid FL1 or the second fluid FL2.

Meanwhile, the second electrode EL2 is formed on the second base substrate BS2 and the column spacer CS is formed on the second base substrate BS2 on which the second electrode EL2 is formed (S201, S203). The column spacer CS is formed by a photolithography process using a ninth mask. In detail, the column spacer CS is formed by coating a high-viscosity organic material on the second base substrate BS2 using a split coater and patterning the high-viscosity organic material using a photolithography process.

The method of forming the second electrode EL2 and the column spacer CS on the second base substrate BS2 is not shown. Then, when the first base substrate BS1 on which the electrowetting layers FL1 and FL2 are formed is coupled to the second base substrate BS2 on which the column spacer CS is formed, the electrowetting display device is completed (S300).

In an electrowetting display device, the pixel PXL is in the ON-state when there is a non-zero electric potential difference between the first electrode EL1 and the second electrode EL2. The electrostatic force caused by the electric potential difference causes the second fluid FL2 to flow into the first electrode EL1, and thus pushing the first fluid FL1 out from at least the portion of the hydrophobic layer HPL to the partition wall WL surrounding the hydrophobic layer HPL. When the first fluid FL1 is completely pushed out, the first fluid FL1 may have a drop shape. Accordingly, the hydrophobic layer HPL of the pixel PXL is exposed through the first fluid FL1. When the voltage difference between the first and second electrodes EL1 and EL2 returns to about zero, the pixel PXL returns to the OFF-state, so that the first fluid FL1 again covers the hydrophobic layer HPL since the electrostatic force caused by the electric potential difference has disappeared. As described above, the first fluid FL1 serves as an optical switch that can be electrically controlled in each pixel PXL.

According to the above, the number of the photolithography processes required to manufacture an electrowetting display device according to a present exemplary embodiment is less than the number of the photolithography processes required to manufacture a conventional electrowetting display device. For example, a conventional electrowetting display device is manufactured by photolithography processes with 14 masks, but an electrowetting display device according to a present exemplary embodiment is manufactured by photolithography processes with 9 masks. That is, in an electrowetting display device according to a present exemplary embodiment, since the partition wall WL is black, the partition wall WL and a black matrix, which are otherwise formed by separate processes, can be formed by a single photolithography process. In addition, the hydrophobic layer HPL is formed after the partition wall WL is formed, and thus a photolithography process required to pattern the hydrophobic layer HPL is omitted. Further, since the barrier layer BR is formed by a vapor deposition method using a shadow mask instead of a photolithography process, an additional photolithography process is omitted.

Although exemplary embodiments of the present disclosure have been described, it is understood that embodiments of the present disclosure should not be limited to these exemplary embodiments but various changes and modifications can be made by one ordinary skilled in the art within the spirit and scope of the present disclosure as hereinafter claimed.

For example, in an electrowetting display device according to a present exemplary embodiment, the first electrode and the second electrode are respectively formed on the first base substrate and the second base substrate, but embodiments are not limited thereto. The first and second electrodes may be formed on one of the first and second base substrates, and shapes of the first and second electrodes are not limited to exemplary shapes disclosed above.

What is claimed is:

1. An electrowetting display device comprising:
   a first base substrate;
   a second base substrate facing the first base substrate;
   an electrowetting layer that includes a first fluid and an electrically conductive second fluid that are immiscible with each other; and
   a first pixel and a second pixel, each of the first pixel and the second pixel comprising:
      one or more respective partition walls disposed on the first base substrate to restrict a fluid flow of at least one of the first fluid or the second fluid;
      a respective transistor disposed on the first base substrate;
      a respective color filter disposed on the first base substrate;
      a respective first electrode disposed on the respective color filter and electrically connected to the respective transistor; and
      a respective second electrode portion disposed on the second base substrate;
   wherein the second electrode portion of the first pixel is electrically connected to the second electrode portion of the second pixel.

2. The electrowetting display device of claim 1, the first pixel further comprising a hydrophobic layer.

3. The electrowetting display device of claim 2, wherein the hydrophobic layer does not overlap with at least one of the one or more partition walls of the first pixel.

4. The electrowetting display device of claim 1, further comprising a column spacer disposed on the second base substrate at a position corresponding to at least a partition wall of the one or more partition walls of the first pixel, wherein the column spacer and the partition wall maintain a distance between the first base substrate and the second base substrate.

5. The electrowetting display device of claim 4, wherein the column spacer has a height greater than a height of the partition wall.

6. The electrowetting display device of claim 4, wherein the flow of the first fluid is restricted by the partition wall, and the first fluid has a maximum height greater than or equal to the height of the partition wall.

7. The electrowetting display device of claim 1, further comprising a third pixel having a transparent filter, wherein the third pixel lacks a color filter.

8. The electrowetting display device of claim 7, wherein the transparent filter has a height corresponding to a height of the color filter of the first pixel or has a height corresponding to a height of the color filter of the second pixel.

9. The electrowetting display device of claim 1, the first pixel further comprising a patterned structure comprising a transparent material, the patterned structure disposed on the transistor of the first pixel to cover at least a first portion of the transistor of the first pixel and to expose at least a second portion of the transistor of the first pixel through a contact hole, wherein the first electrode of the first pixel is connected to the transistor of the first pixel through the contact hole.

10. The electrowetting display device of claim 9, wherein the color filter of the first pixel is provided with a thru-hole corresponding to the contact hole, the thru-hole has a diameter greater than a diameter of the contact hole, and at least a portion of the patterned structure is provided in the thru-hole.

11. The electrowetting display device of claim 9, further comprising a third pixel having a transparent filter disposed on the first base substrate, wherein the transparent filter comprises the transparent material and is formed in a same layer as the patterned structure.

12. The electrowetting display device of claim 1, further comprising a barrier layer disposed on the first electrode of the first pixel and the color filter of the first pixel.

13. The electrowetting display device of claim 1, further comprising:
   a display area including the first pixel and the second pixel; and
   a non-display area disposed adjacent to at least a side of the display area.

14. The electrowetting display device of claim 1, further comprising:
   a first column spacer disposed on the second base substrate at a first position corresponding to a first partition wall of the one or more partition walls of the first pixel or of the one or more partition walls of the second pixel; and
   a second column spacer disposed on the second base substrate at a second position corresponding to a second partition wall of the one or more partition walls of the first pixel or of the one or more partition walls of the second pixel; wherein
   the second position is spaced apart from the first position to permit flow of at least some of the second fluid through an area between the first column spacer and the second column spacer; and
   at least the first column spacer or the second column spacer has a plan-wise cross-section that is at least partly linear, cross-shaped, or circular.

15. The electrowetting display device of claim 1, wherein at least one of the one or more partition walls of the first pixel or at least one of the one or more partition walls of the second pixel comprises a pigment or dye that absorbs at least some light in a visible wavelength range and transmits at least some light in an infrared wavelength range.

16. An apparatus comprising:
   a first base substrate;
   a second base substrate facing the first base substrate;
   an electrowetting layer that includes a first fluid and an electrically conductive second fluid that are immiscible with each other;
   a first pixel comprising a first color filter disposed on the first base substrate, a first pixel electrode disposed on the first color filter, and a first common electrode portion disposed on the second base substrate;
   a second pixel comprising a second color filter disposed on the first base substrate, a second pixel electrode disposed on the second color filter, and a second common electrode portion disposed on the second base substrate and electrically connected to the first common electrode portion; and
   one or more partition walls disposed on the first base substrate to restrict a fluid flow of at least one of the first fluid or the second fluid between the first pixel and the second pixel.

17. The apparatus of claim 16, wherein the first pixel further comprises a hydrophobic layer.

18. The apparatus of claim 17, wherein the hydrophobic layer does not overlap with at least one of the one or more partition walls.

19. The apparatus of claim 16, further comprising a column spacer disposed on the second base substrate at a position corresponding to at least a partition wall of the one or more partition walls, wherein the column spacer and the partition wall maintain a distance between the first base substrate and the second base substrate.

20. The apparatus of claim 19, wherein the column spacer has a height greater than a height of the partition wall.

21. The apparatus of claim 19, wherein the flow of the first fluid is restricted by the one or more partition walls, and the first fluid has a maximum height greater than or equal to the height of the partition wall.

22. The apparatus of claim 16, further comprising a third pixel that lacks a color filter and that includes a transparent filter.

23. The apparatus of claim 22, wherein the transparent filter has a height corresponding to a height of the first color filter or a height of the second color filter.

24. The apparatus of claim 16, the first pixel further comprising a transistor disposed on the first base substrate and connected to the first pixel electrode.

25. The apparatus of claim 24, further comprising a patterned structure disposed on the transistor to cover at least a first portion of the transistor and to expose at least a second portion of the transistor through a contact hole, wherein the first pixel electrode is connected to the transistor through the contact hole.

26. The apparatus of claim 25, wherein the first color filter is provided with a thru-hole corresponding to the contact hole, the thru-hole has a diameter greater than a diameter of the contact hole, and at least a portion of the patterned structure is provided in the thru-hole.

27. The apparatus of claim 25, further comprising a third pixel that includes a transparent filter formed in a same layer as the patterned structure.

28. The apparatus of claim 24, further comprising a storage electrode, wherein:
the transistor comprises a source electrode and a drain electrode; and
at least the source electrode or the drain electrode is electrically connected to the first pixel electrode and is arranged at least partly between the first color filter and the storage electrode.

* * * * *